United States Patent
Parvin et al.

[11] Patent Number: 6,167,465
[45] Date of Patent: Dec. 26, 2000

[54] SYSTEM FOR MANAGING MULTIPLE DMA CONNECTIONS BETWEEN A PERIPHERAL DEVICE AND A MEMORY AND PERFORMING REAL-TIME OPERATIONS ON DATA CARRIED BY A SELECTED DMA CONNECTION

[75] Inventors: Shaham Parvin, Fremont; Gary M. Catlin, San Jose, both of Calif.

[73] Assignee: Aureal Semiconductor, Inc., Fremont, Calif.

[21] Appl. No.: 09/082,312

[22] Filed: May 20, 1998

[51] Int. Cl.[7] .................................................... G06F 13/14
[52] U.S. Cl. ............................. 710/22; 710/52; 710/72; 709/250; 370/402
[58] Field of Search ................................. 710/22, 23, 52, 710/53, 72; 370/402; 709/250, 25

[56] References Cited

U.S. PATENT DOCUMENTS

| | | | |
|---|---|---|---|
| 5,412,782 | 5/1995 | Hausman et al. | 709/250 |
| 5,805,778 | 9/1998 | Suzuki | 395/115 |
| 5,870,627 | 2/1999 | O'Toole et al. | 710/22 |
| 5,923,660 | 7/1999 | Shemla et al. | 370/402 |
| 5,944,800 | 8/1999 | Mattheis et al. | 710/23 |

OTHER PUBLICATIONS

"CS4610/11: CrystalClear™ SoundFusion™ PCI Audio Accelerator", 1998, Cirrus Logic 3100 West Warren Ave., Fremont, California: website at www.cirrus.com/products/overviews/cs4610.html.

"PCI Audio Accelarators", 1998, ESS Technology, Inc. 48401 Fremont Blvd., Fremont, California, website at www.esstech.com/product/PCIAudio/pciaudio.htm.

Ensoniq 155 Great Valley Parkway, P.O. Box 3035, Malvern, PA, ENSONIQ AudioPCT™ 97 ES1371 Specification, Oct. 1997, ENSONIQ Audio PCI 97 Specification Rev. 1.1.

"CrystalClear™ SoundFusion™ PCI Audio Accelerator", Mar. 1998, Cirrus Logic Advanced Product Databook CS4610/11.

*Primary Examiner*—Thomas C. Lee
*Assistant Examiner*—Abdelmoniem Elamin
*Attorney, Agent, or Firm*—Ritter, Van Pelt & Yi LLP

[57] ABSTRACT

Accordingly, the present invention provides a method and an apparatus of establishing multiple direct memory access connections between a peripheral and a main memory of a computer system. Each of the multiple direct memory access connection is managed in an improved manner such that one or more of the multiple direct memory access connections are non-real-time connections, but real-time operations may be performed on the data carried by the non-real time connections. In another aspect of the present invention, a driver may be implemented on the computer system to facilitate the establishment and maintenance of the multiple direct memory access connections. The present inventions reduce arbitration and system interrupt latencies and reduces the management burden of the direct memory access connections on a central processing unit of the computer system.

9 Claims, 17 Drawing Sheets

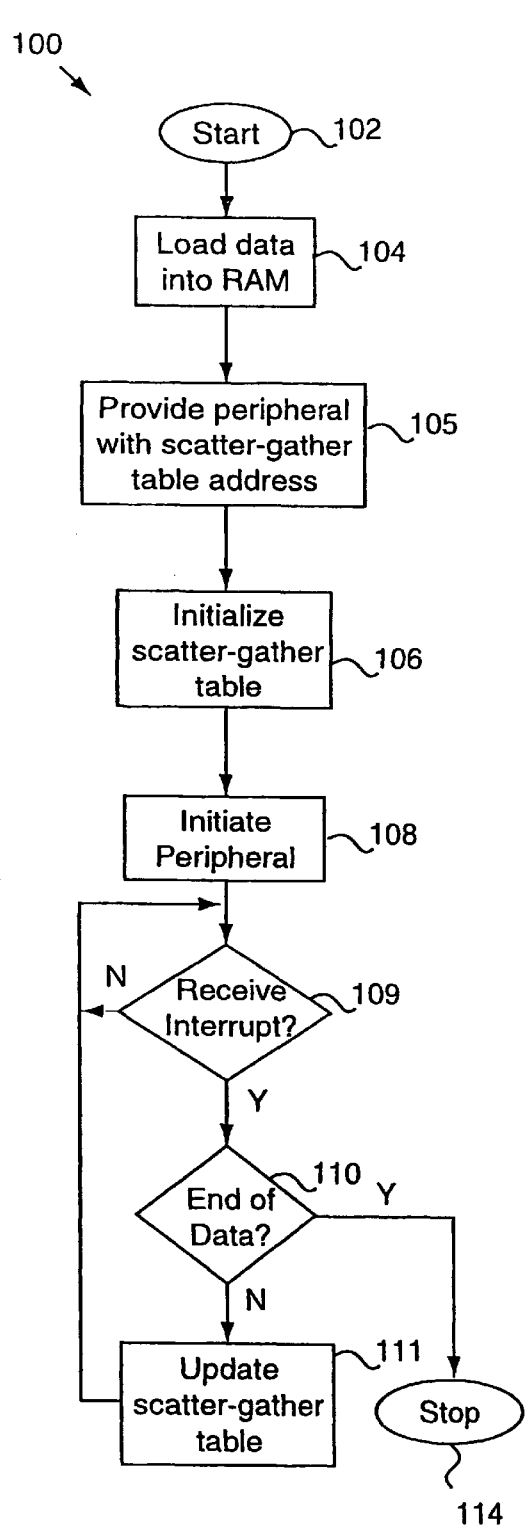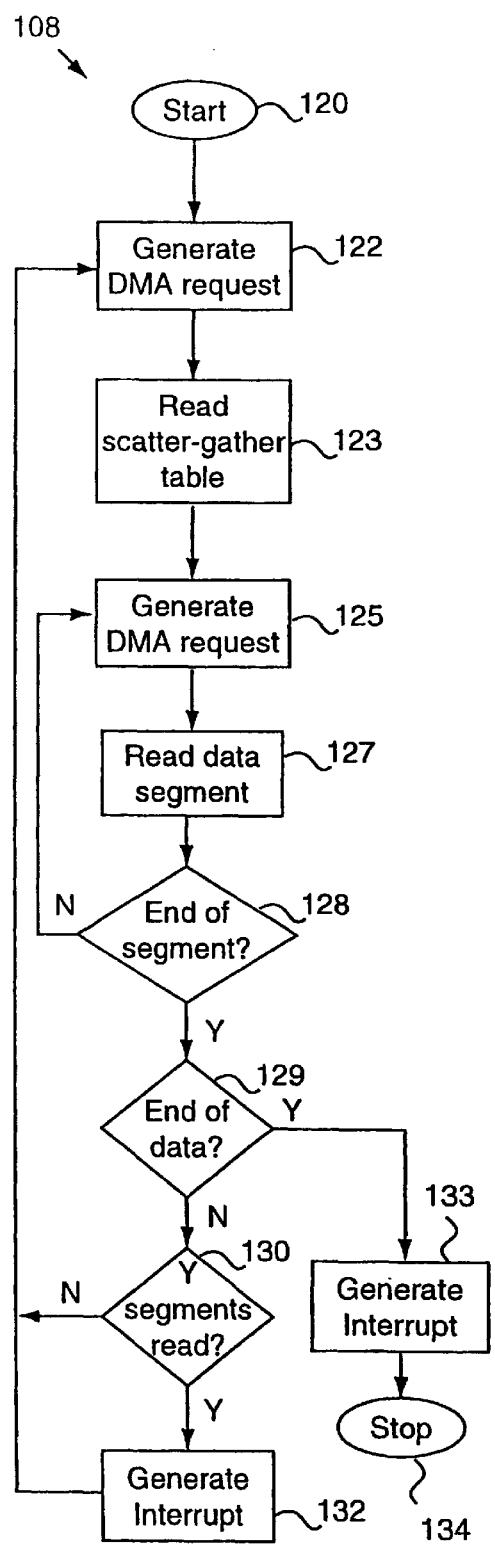
Fig. 7
Fig. 8

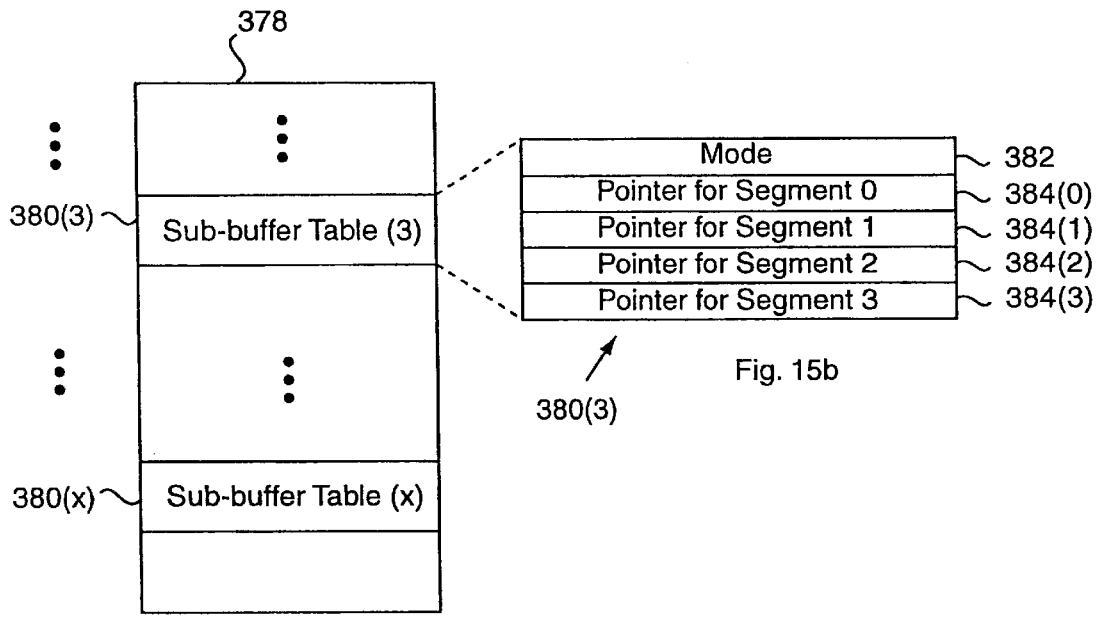
Fig. 15a
Fig. 15b
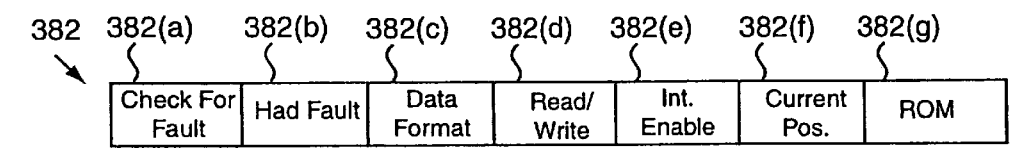
Fig. 15c
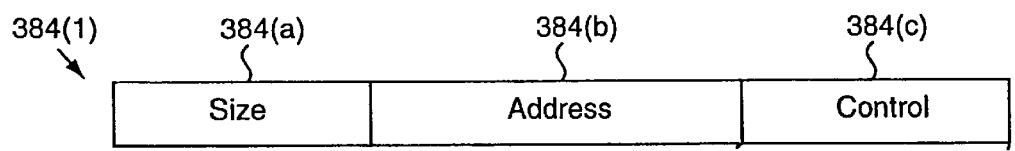
Fig. 15d
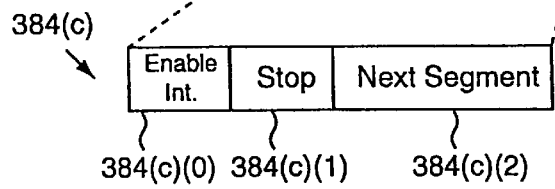
Fig. 15e

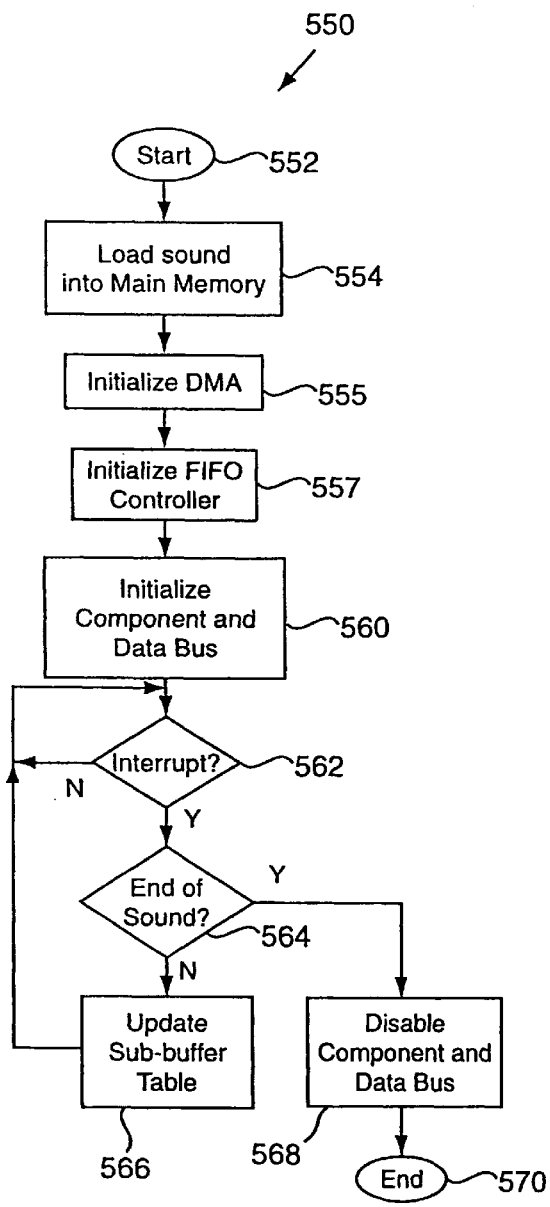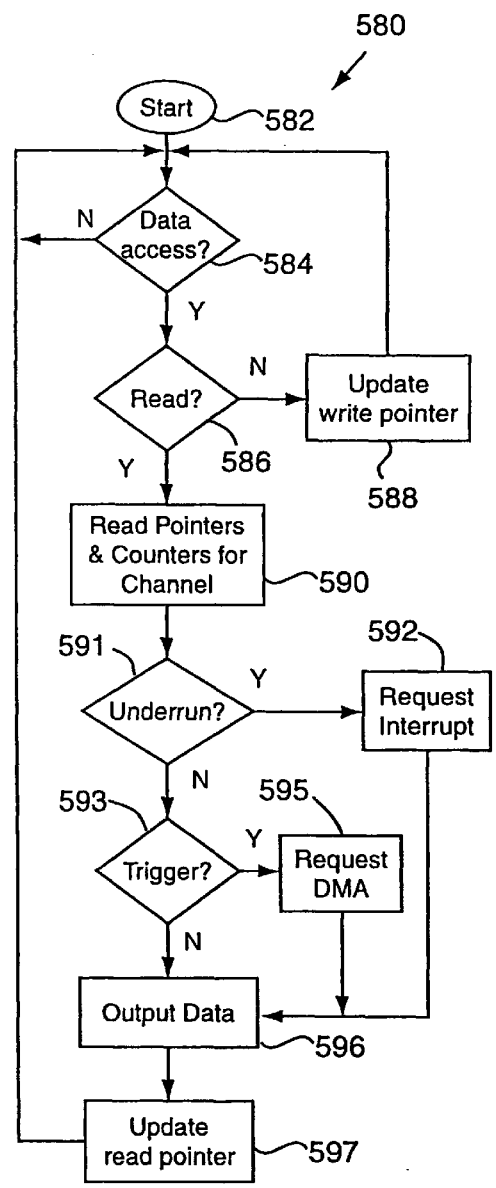
Fig. 19
Fig. 20

SYSTEM FOR MANAGING MULTIPLE DMA CONNECTIONS BETWEEN A PERIPHERAL DEVICE AND A MEMORY AND PERFORMING REAL-TIME OPERATIONS ON DATA CARRIED BY A SELECTED DMA CONNECTION

BACKGROUND OF THE INVENTION

The present invention relates generally to the field of computer systems, and real time processing systems. The present invention is more particularly related to methods and apparatuses for managing multiple direct memory access channels.

Since the advent of the computer system, efforts have been focused on increasing its speed and capabilities. One thrust in the technology has been aimed in the direction of peripheral devices. Peripheral devices are capable of handling specific functions that were once commonly performed by the central processing unit (CPU), the heart of the computer system. Today, peripheral cards and devices handle many types of specific tasks, allowing the CPU to handle the management of the computer system. For example, peripheral cards exist for audio processing, video processing, digital signal processing, modem interface, network interface, 3-D graphics processing and many more.

Indirectly, the proliferation of peripheral devices used in a computer system has increased the CPU's management burden. Peripheral systems typically need access to memory located on the computer system, or main memory. Conventionally, the CPU has been burdened with the task of managing transfer of data during a peripheral devices' accesses to the main memory.

Direct memory access systems have helped to relieve the burden on the CPU. FIG. 1 is a block diagram of a computer system 2 utilizing a direct memory access system. Computer system 2 includes a CPU 10, a main memory 12, a bus controller 13, a direct memory access (DMA) controller 15, a bus 20 and peripheral devices 30, 32 and 33. In the illustrated computer system, the peripherals are an audio processing card 30, a video processing card 32 and a digital signal processing card 33.

In the computer system, DMA controller 15 manages accesses to main memory 12 by peripherals 30, 32 and 33. Initially, a software application is normally implemented on CPU 10, which controls the operation of a particular peripheral device, commonly referred to as a driver. Typically, the driver would initially set up a peripheral device, for example audio processing card 30.

Another application implemented on CPU 10 might then request a sound to be played. The driver may then retrieve a piece of audio data from an external memory source, such as a disk drive, and place it in main memory 12. The driver, through CPU 10, would typically inform DMA controller 15 of the size of the data transfer. DMA controller 15 normally establishes a single direct memory access connection between main memory 12 and audio processing card 30 via bus 20 via bus controller 13.

Throughout the transfer of the audio data between main memory 12 and audio processing card 30, DMA controller 15 manages the DMA channel while CPU 10 manages the transfer to data from the memory source to main memory 12, as will be discussed further below. The constant interaction between CPU 10, DMA controller 15 and main memory 12 adds to the duties of the CPU. Essentially, the peripheral devices are slaves and CPU 10 and DMA controller 15 are the masters, which means that the CPU and the DMA controller have the responsibilities of establishing and maintaining the data transfer through the DMA channels between main memory 12 and the peripheral devices 30, 32, and 33.

Additionally, computer systems are typically capable of only establishing a limited number of DMA channels between main memory 12 and peripherals 30, 32 and 33. Typically, only one DMA channel is established per peripheral device. The limited number of DMA channels limits the number of peripheral devices that may be connected to bus 20, and the amount of information that may be transferred from main memory 12 to the peripheral devices.

In more recent systems, computer systems have incorporated a peripheral component interconnect (PCI) bus and an associated controller to increase the bandwidth between main memory and peripheral devices, referring to FIG. 2. FIG. 2 depicts a prior art computer system 3 utilizing a peripheral component interconnect bus 21. Computer system 3 typically includes CPU 10, main memory 12, a PCI bus controller 16, PCI bus 21, and PCI compatible peripheral devices 40, 42 and 43.

An advantage of PCI bus 21 is that it is capable of handling more data than older prior art buses, as well as allowing peripherals to act as bus masters. For example, current PCI buses are normally capable of handling 132–266 megabytes per second, and as high as 572 megabytes per second. Older prior art buses have typically been limited to about 33 megabytes per second (e.g., ISA buses are limited about 8.3 mbps and EISA buses are limited to 33 mbps).

Another difference between PCI bus 21 and older buses is the capability of establishing a greater number of DMA channels between main memory 12 and peripheral devices, partly because peripherals can act as bus masters. However, even the PCI computer system 3 typically only establishes one DMA channel per peripheral device between main memory 12 and a particular peripheral device 40, 42 and 43. Thus, while the bandwidth of a DMA channel established between main memory 12 and a peripheral device may be increased, up to the bandwidth of PCI bus 21, the DMA channel is still limited to the bandwidth of the particular bus 21.

Therefore, the introduction of a PCI bus into prior art computer systems, has only somewhat alleviated the bandwidth limitations of older prior art computer systems. Additionally, the PCI bus has only partially solved the management problems associated with DMA data transfers. In computer system 3, the peripherals handle the transfer of data after a DMA channel has been initiated. Therefore, some of the responsibilities of establishing and maintaining a DMA channel have been relegated to peripheral devices 40, 42 and 43.

In a typical operation, a driver is implemented on CPU 10, for example an audio processing peripheral driver. A request by another application for the playback of audio data normally triggers the driver, vis a vis CPU 10, to move the requested audio data from an external source to main memory 12. The driver informs audio peripheral 40 that the requested audio data is ready for retrieval. Audio processing peripheral 40 acts as the master rather than the PCI bus controller 16 and CPU 10 directing the actual transfer. Audio processing peripheral 40 typically sends a request to PCI bus controller 16 for access to PCI bus 21. The other peripherals 42 and 43 may also be requesting control of the PCI bus, and PCI bus controller arbitrates the requests in order to allow the orderly transfer of information from main memory 12 to the various peripherals 40, 42 and 43.

In that respect, PCI bus controller 16 and CPU 10 are relieved of the duty of keeping track of and establishing DMA channels with the various peripherals. However, even in PCI based computer systems CPU 10 may be overly burdened with the management of the actual transfer of the data from main memory 12 to peripherals 40, 42 and 43.

Typical methods of managing data in main memory and the transfer of data to a peripheral vary, referring to FIGS. 3–5. FIG. 3 depicts a memory map of main memory 12 of either FIG. 1 or FIG. 2. A driver implemented on CPU 10 may retrieve a requested block of data 50 from another memory medium and store it in main memory 12. As illustrated, data 50 may be segmented into multiple data segments 50(0)–50(n). Data segments 50(0)–50(n) also may be segmented in a non-sequential order.

Assuming the above situation of transferring data to audio processing peripheral 40, in order to pass along data segments 50(0)–50(n) to audio processing peripheral 40, one method has been to utilize ping and pong buffers 55 and 56, respectively. Generally, data segments 50(0)–50(n) are copied from their respective locations in main memory 12 to ping and pong buffers 55 and 56 by CPU 10, for transfer to peripheral 40, as discussed further in reference to FIGS. 4–5.

FIGS. 4–5 are diagrammatic flow charts describing a DMA transfer utilizing ping and pong buffers 55 and 56. FIG. 4 describes the function of CPU 10, as directed by the audio driver, during a DMA transfer. FIG. 5 describes the function of audio processing peripheral 40 during the DMA transfer.

Initially, in FIG. 4, the audio driver is initiated in block 71. The driver loads a requested block of data 50 into main memory 12 in block 73. In block 76, the driver provides the addresses and the sizes of ping and pong buffers 55 and 56 to peripheral 40. Once audio processing peripheral 40 is made aware of the locations of ping and pong buffers 55 and 56, the driver loads ping and pong buffers 55 and 56 with the first segments of the block of data 50. Depending on the sizes of the data segments 50(0)–50(n), and the sizes of ping and pong buffers 55 and 56, an entire data segment may be loaded into either ping or pong buffers 55 or 56, or only pieces of a data segment. However, initially, the first data segment 50(0) is loaded in ping and pong buffers 55 and 56, sequentially, with ping buffer 55 containing the first piece of data segment 50(0).

The driver then initiates the operation of peripheral 40 to begin the download of data 50 from main memory 12 in block 78. Referring now to FIG. 5, audio processing peripheral 40 is started in block 91. In block 92, peripheral 40 may send out a DMA request to PCI bus controller 16. The DMA request typically asks PCI bus controller 16 to hand over control of PCI bus 21 to peripheral 40 until it has finished retrieving data, or until another peripheral 42 or 43 or CPU 10 requires the use of PCI bus 21. Peripheral 40 waits in block 92 until it is given control over PCI bus 21. Once control is obtained, peripheral 40 reads the contents of ping buffer 55 in block 93. Peripheral 40 may or may not have a chance to read the entire ping buffer 55 before control over PCI bus is returned to PCI bus controller 16. Thus, in block 94, peripheral 40 determines if the entire ping buffer 55 was read. If not, peripheral requests another DMA access, returning to block 92.

If peripheral 40 was successful in reading the entire contents of ping buffer 55, in block 95, peripheral 40 generates an interrupt to CPU 10 to interrupt the operations of the audio driver. Referring back to FIG. 4, after the audio driver has initiated peripheral 40 in block 78, the audio driver had gone into a wait state in block 79, waiting for an interrupt from peripheral 40. Once an interrupt is received in block 79 the driver determines, in block 82 if the interrupt was generated by peripheral 40 because all of data 50 has been transferred. If the end of data 50 has not be transferred to peripheral 40, CPU 10 loads either the ping or the pong buffer with the next data segment 50(0)–50(n) or any portion thereof from main memory 12, in block 84, depending on which buffer 55 or 56 had just been read out to peripheral 40. For example, if ping buffer 55 had just been read out, it would be loaded with the next piece of data, and similarly if pong buffer 56 had just been read out. The driver then returns to block 79 and waits for the next interruption.

Referring back to FIG. 5, at the same time CPU 10 updates ping buffer 59, peripheral 40 typically obtains control over PCI bus 21 in order to read pong buffer 56 in block 96. In block 97, once control is obtained, pong buffer 56 is read by peripheral 40. Again, if the entire contents of pong buffer 56 had not been read out, block 96 directs peripheral 40 to attempt to again gain control over PCI bus 21. Once all the contents of pong buffer 56 have been transferred to peripheral 40, CPU 10 is again interrupted in block 99.

Referring back to FIG. 4, once an interrupt (generated by either blocks 95 or 99 of FIG. 5) is detected in block 79, CPU 10 proceeds to block 82, under the direction of the audio driver, and determines if the end of data 50 has been transferred. If not, the appropriate ping or pong buffer is loaded with the next data segment 50(0)–50(n). If the end of data 50 has been transferred, process flow proceeds to block 86 and stops peripheral operations 78, and then ends the operations of the audio driver in block 87. The above is a typical establishment and conduct of operations of a DMA channel using ping and pong buffers 55 and 56 in main memory.

As can be appreciated, the use of ping and pong buffers 55 and 56 requires extensive operations by CPU 10, under the direction of the driver, in maintaining the DMA transfer. Each DMA channel established by peripherals 40, 42 and 43 normally requires that CPU 10 continually update a set of ping and pong buffers 55 and 56. While audio processing peripheral 40 may be able to retrieve data faster than in non-PCI prior art computer systems primarily, due to the increased bandwidth of PCI bus 21, the burden on CPU 10 may not be significantly alleviated. This method is especially burdensome since CPU 10 must read and write every single byte of data from data segments 50(0)–50(n) to ping and pong buffers 55 and 56.

Another method of transferring data, referring to FIGS. 6–8, involves the use of a scatter-gather table. FIG. 6 depicts an alternate memory map of main memory 12 of FIG. 2. As with the ping and pong buffer memory map of FIG. 3, requested data 50 is segmented into data segments 50(0)–50(n) in main memory 12. However, instead of ping and pong buffers, a scatter-gather table 60 is mapped within main memory 12. Typically, scatter-gather table contains some of the addresses and sizes of data segments 50(0)–50(n), but normally not all the addresses and sizes of all the data segments.

Again using the example of an audio driver, scatter-gather table 60 is used by the driver, via CPU 10, to keep track of all the data segments 50(0)–50(n), referring to FIGS. 7–8. FIGS. 7–8 are diagrammatic flow charts describing a DMA transfer utilizing scatter-gather table 60. FIG. 7 depicts a flow chart 100 of the operations of CPU 10, as directed by the audio driver, during a DMA transfer. FIG. 8 depicts a flow chart 108 of the operations of audio processing peripheral 40 during the DMA transfer.

Flowchart 100 begins in block 102 with the implementation of the audio driver on CPU 10. The driver will typically receive a signal from another application instructing the driver to play a sound. In block 104 the driver retrieves the requested block of data 50 from another memory source and places it into main memory 12. After data 50 has been segmented and placed in main memory as data segments 50(0)–50(n), in block 105 the driver gathers up the addresses and sizes of a number of the first data segments. The number of addresses and sizes may vary, but typically do not contain all the addresses and sizes of all data segments 50(0)–50(n) unless data 50 is small.

For purposes of illustration, in block 106, the audio driver places the addresses and sizes of data segments 50(0)–50(x), where "x" is less than "n", into scatter-gather table 60 in main memory. The driver then initiates audio processing peripheral 40 in block 108. Block 108 is further described in FIG. 8.

In reference to FIG. 8, audio processing peripheral 40 is started in step 120. Typically, in block 122, audio processing peripheral initiates a PCI DMA burst request in order to obtain control over PCI bus 21. After PCI bus controller 16 gives control over PCI bus 21 to audio processing peripheral 40, in block 123, audio processing peripheral 40 first obtains the address and size of the first data segment, or 50(0).

With the address and size of data segment 50(0), audio processing peripheral 40 then attempts to obtain control over PCI bus 21 again in block 125. After again obtaining control of PCI bus 21, in block 127 audio processing peripheral 40 begins to read the contents of data segment 50(0).

After control is turned back to PCI bus controller 16, peripheral 40 determines, in block 128, whether the entire data segment 50(0) was successfully read from main memory 12. If not, peripheral 40 returns to block 125 to finish reading data segment 50(0). Once all of data segment 50(0) has been read from main memory 12, in block 129, peripheral 40 checks to see if that is the end of data 50. Peripheral 40 proceeds to block 130 if data 50 has not been completely read from main memory 12.

In block 130, audio processing peripheral 40 checks how many data segments have been successfully read from main memory 12. Typically, peripheral 40 will read only a subset of data segments 50(0)–50(x) before requesting CPU 10 to update scatter-gather table 60. For purposes of illustration, audio processing peripheral 40 may check to see if half of the scatter-gather table entries have been read, i.e., 50(0)–50(x/2), rounding down. If less than x/2 data segments have been read, then peripheral 40 returns to block 122. In blocks 122–128, peripheral 40 retrieves the next data segment 50(1), and repeats until data segment 50(x/2) has been read.

Returning back to block 130, with x/2 data segments read, peripheral 40 proceeds to block 132. Peripheral 40 generates an interrupt to CPU 10 in block 132.

Referring back to FIG. 7, CPU 10 proceeded to block 109 after it initiated peripheral 40 in block 108. In block 109, CPU 10 waits for an interrupt from peripheral 40. Once an interrupt is received from peripheral 40 by CPU 10 in block 109, CPU 10 continues to block 110. In block 110 CPU 10 determines if the interrupt was a request to update scatter-gather table 60 or a signal that the end of data 50 has been reached. If the interrupt is a request to update scatter-gather table 60, CPU 10 proceeds to block 111 where CPU 10 updates the scatter-gather table.

CPU 10 typically updates the entries in scatter-gather table 60 that have been read by peripheral 40. When audio processing peripheral 40 reaches the end of scatter-gather table 60 the peripheral may loop back to the beginning of scatter-gather table 60 and read the newly edited entries. In the illustrated example, CPU 10 replaces the entries of data segments 50(0)–50(x/2) with the next grouping of entries for data segments 50(x+1)–50(x+1+(x/2)), or if (x+1+(x/2)) is greater than "n", 50(x+1)–50(n). Once scatter-gather table 60 has been updated, CPU 10 returns to block 109.

Returning back to FIG. 8, audio processing peripheral 40 proceeds from block 132 back to block 122 to retrieve further entries in scatter-gather table 60 and the corresponding data segments. Peripheral 40 will continue to retrieve data segments and interrupt CPU 10 until scatter-gather table 60 has been updated with the relevant information of the last data segment 50(n). After peripheral 40 has read the contents of data segment 50(n), peripheral 40 will proceed from block 129 to block 133 and generate a final interrupt.

Returning back to block 109 of FIG. 7, CPU receives the last interrupt and proceeds to block 110. CPU 10 then determines that the interrupt was generated due to the last segment condition. CPU proceeds to block 114 where the DMA channel is terminated.

While CPU 10 is not constantly shuffling data from one memory location to another location, as in the ping and pong method, the burden of keeping track of data segments 50(0)–50(n) is delegated to peripheral 40. Additionally, peripheral 40 is required to execute more PCI DMA burst requests to PCI bus controller 16. It may be appreciated by those skilled in the art that DMA requests are typically not immediately satisfied and spurious delays in obtaining control of PCI bus 21 may occur. Further, the simple fact of having to read scatter-gather table 60 and then proceed to obtain the corresponding data segment introduces further delays. The delays involved may sometime cause real-time operations to glitch. Another drawback is the additional memory and resources needed by peripheral 40 in order to maintain the information about data segments 50(0)–50(n).

Thus, typical prior art systems encounter problems that limit their abilities to handle more than one PCI DMA channel per peripheral. Namely, arbitration latency caused by requiring the peripheral to constantly consult a scatter-gather in order to carry out a single PCI DMA channel.

System interrupt delays also pose a significant limitation on the abilities of prior art systems. As explained, typical prior art systems require numerous interrupts to the CPU to continue operations. The CPU is required to respond to every interrupt and constantly update the operations of the peripheral. Interrupts to the CPU are often times delayed because of the CPU's many duties and may not be the most efficient method of managing PCI DMA channels.

While the two illustrated prior art methods of establishing and maintaining a DMA channel are only a few, the drawbacks of prior art methods are similar. That is, prior art methods unduly burden the CPU with the tasks of managing the DMA channels established, or places the burden on the peripheral, requiring additional memory and resources. Also, the problem of limited bandwidth between the main memory and a peripheral still exists. While the PCI bus and future buses may extend the bandwidth of a DMA channel, current and future real-time operations may require even greater bandwidths.

Perhaps an even greater burden on the CPU occurs before any of the management of a DMA request. In prior art systems the CPU must not only provide data to a peripheral device it must also perform operations on the data before it is handed over to the peripheral. Audio data, for example, in prior art systems is often times processed by the CPU before being sent to an audio peripheral device for output. The processing may entail mixing, amplification, frequency modulation or other types of processing. Thus, the CPU had to perform duties in addition to the operation of the primary application.

Thus, what is needed is a method of transferring data from main memory to peripheral devices at greater bandwidths. With increasing proliferation of complex audio and video incorporated into computer systems bandwidth between main memory and peripheral devices may become a critical bottleneck. The ability to increase bandwidth, while at the same time not overburdening the CPU, complex operations by peripherals may be performed without degrading the performance of the CPU. At the same time, methods for transferring data to peripheral devices in their raw form such that the processing of the data may be performed by the peripheral devices rather than the CPU is further desired. Thus, increasing bandwidth, decreasing management of data transfers and transferring the burden of data processing to a peripheral device are the goals to be achieved.

SUMMARY OF THE INVENTION

Accordingly, the present invention provides the ability to increase the bandwidth between main memory and peripheral devices by the disclosed method and an apparatus of establishing multiple direct memory access connections between a peripheral and a main memory of a computer system. Multiple direct memory access connections provide increased bandwidth to allow multiple streams of data to be retrieved from the main memory.

Additionally, the present inventions provides methods and apparatuses for maintaining multiple direct memory access connections while overcoming the problems of arbitration and system interrupt latencies. This is achieved by removing much of the burden of actively managing the operations of the multiple direct memory access connections from the CPU. Further, multiple direct memory access connections also allow data to be conveniently transferred to peripheral devices for processing rather than having a central processing unit of the computer system process the data.

In another aspect of the present invention, each of the multiple direct memory access connections is managed in an improved manner such that one or more of the multiple direct memory access connections are non-real-time connections, but real-time operations may be performed on the data provided by the non-real time connections.

In one embodiment of the invention, a peripheral device establishes a plurality of direct memory access connections with a main memory of a computer system and retrieves a block of data from the main memory through a selected one of the direct memory access connections. In another embodiment, the block of data is segmented into a plurality of data segments and the peripheral device retrieves the data segments.

In a further embodiment, the computer system provides a plurality of addresses indicative of the location of the data segments to the peripheral. The peripheral retrieves the data segments according to the addresses. In a still further embodiment, the computer system provides a first subset of the plurality of addresses to the peripheral and provides further subsets of the plurality of addresses as the peripheral retrieves a subset of data segments corresponding to the first subset of addresses.

In another embodiment, the peripheral includes a plurality of buffer memories. The buffer memories buffer the block of audio data as the block of audio data is retrieved from the main memory. In a further embodiment, each of the buffer memories corresponds to one of the plurality of direct memory access connections. In a further embodiment, a buffer memory controller queues a direct memory access request when a buffer memory requires more data.

In another embodiment of the present invention, a driver is implemented on the computer system. The driver provides the peripheral device with the plurality of addresses of the data segments. Methods for an improved method of managing a direct memory access connection, and establishing a plurality of direct memory access connections are further disclosed. These and other features and advantages of the present invention will be presented in more detail in the following specification of the invention and the figures.

BRIEF DESCRIPTION OF THE DRAWINGS

FIG. 7 is a diagrammatic flow chart describing a DMA transfer utilizing a scatter-gather table.

FIG. 8 is a diagrammatic flow chart further describing a DMA transfer utilizing a scatter-gather table.

FIG. 15*a* is a diagrammatic block diagram of a DMA details memory, in accordance with one embodiment of the present invention.

FIG. 15*b* is a diagrammatic block diagram of a typical sub-buffer table of the DMA details memory of FIG. 15*a*, in accordance with one embodiment of the present invention.

FIG. 15*c* is a diagrammatic block diagram of a typical mode register of the sub-buffer table of FIG. 15*b*, in accordance with one embodiment of the present invention.

FIG. 15*d* is a diagrammatic block diagram of a typical data segment pointer of the sub-buffer table of FIG. 15*b*, in accordance with one embodiment of the present invention.

FIG. 15e is a diagrammatic block diagram of the control register of FIG. 15d, in accordance with one embodiment of the present invention.

FIG. 19 is a diagrammatic flow chart of the operations of the CPU of FIG. 9, in accordance with one embodiment of the present invention.

FIG. 20 is a diagrammatic flow chart of the operations of the FIFO controller of FIG. 14, in accordance with one embodiment of the present invention.

DETAILED DESCRIPTION OF THE INVENTION

The present inventions provide methods and apparatuses for establishing multiple DMA channels for a single peripheral, and establishing and maintaining the DMA channels without overly burdening the CPU. The use of multiple DMA channels alleviates the problem of limited bandwidths. Multiple DMA channels also reduce latencies, which combined with increased bandwidths, aid in real time operations. Additionally, multiple DMA channels allow multiple streams of data to be transferred at once. The ability to transfer larger amounts of data with less of a burden on the CPU allows the transfer of raw data such that a peripheral device may perform any processing rather than having the CPU perform such extraneous operations.

In one embodiment, an improved method for establishing and maintaining a DMA channel, which typically reduces the amount of housekeeping required of the CPU, is disclosed. Additionally, the peripheral is not inordinately burdened with the housekeeping task to the extent that greater amounts of memory or other resources are required by the peripheral. The method of establishing and maintaining a DMA channel alone is an improvement over prior art methods.

In another embodiment, the method of establishing and maintaining a DMA channel is applied to multiple DMA channels for one peripheral device. Further prioritization and maintenance of the multiple DMA channels provides reduced latencies and the needed bandwidth to conduct real-time operations while minimizing the chances of glitches.

Figure 1:
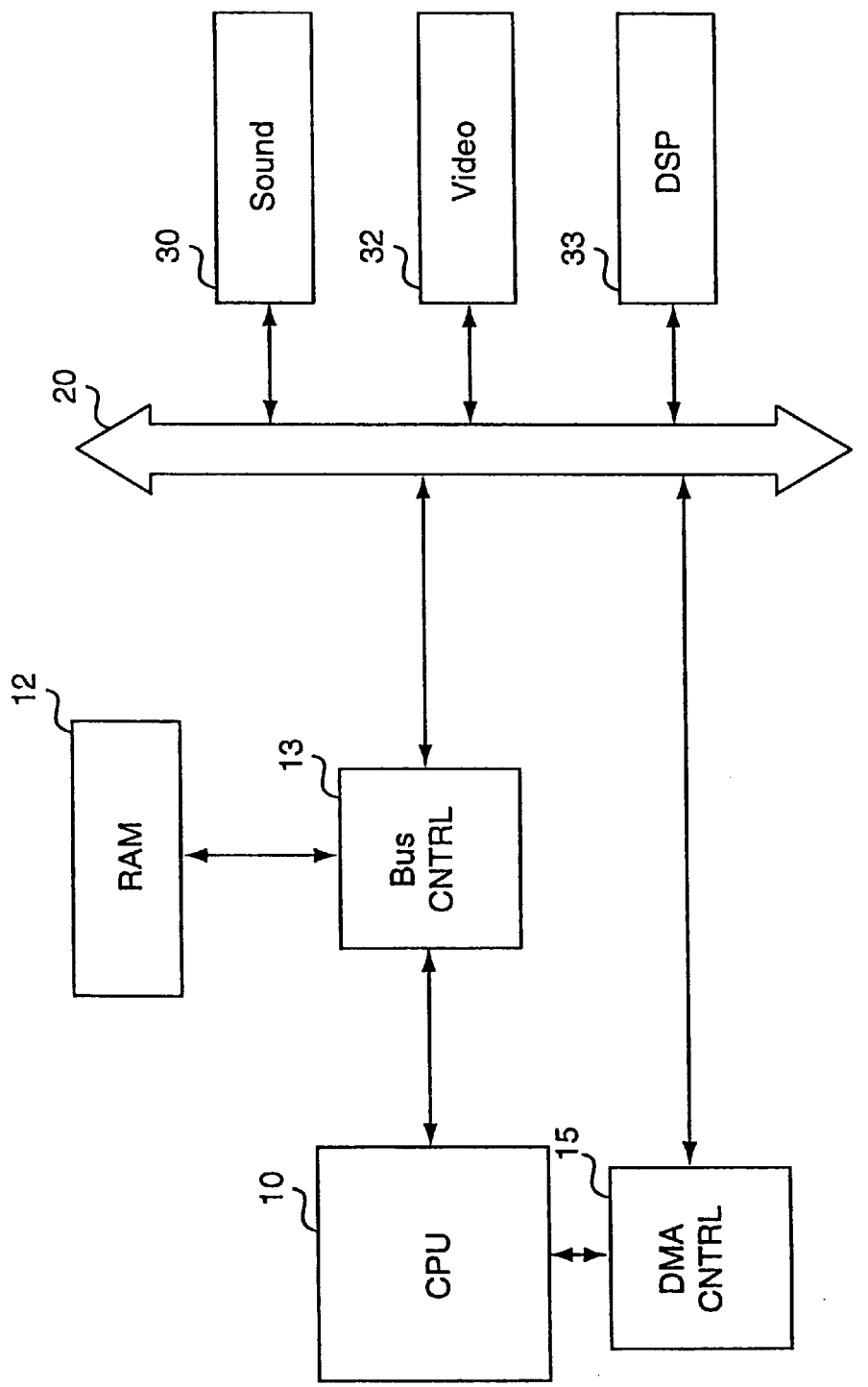
FIG. 1 is a block diagram of a prior art computer system utilizing a direct memory access system.
Figure 2:
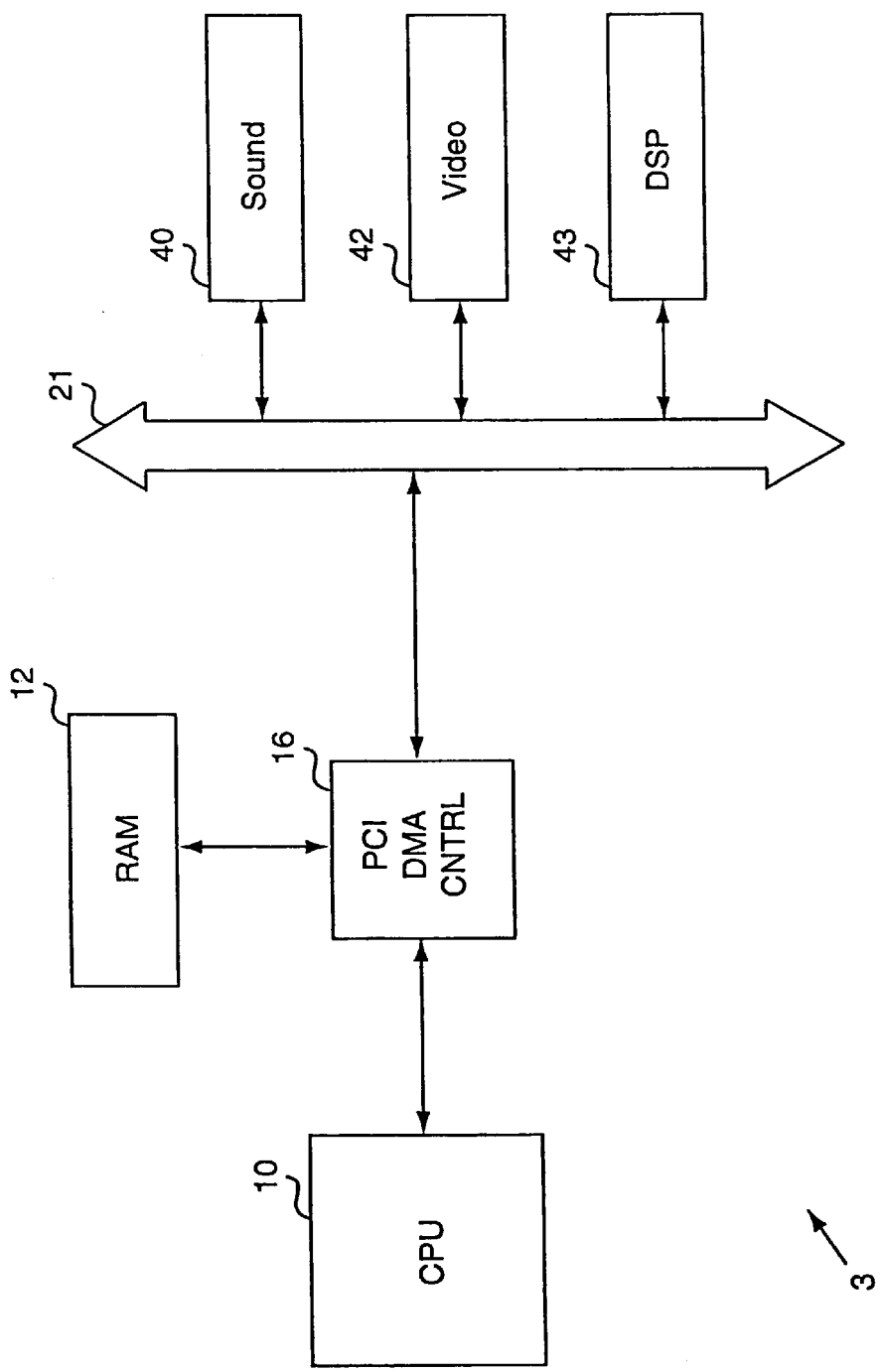
FIG. 2 is a block diagram of a prior art computer system utilizing a peripheral component interconnect bus.
Figure 3:
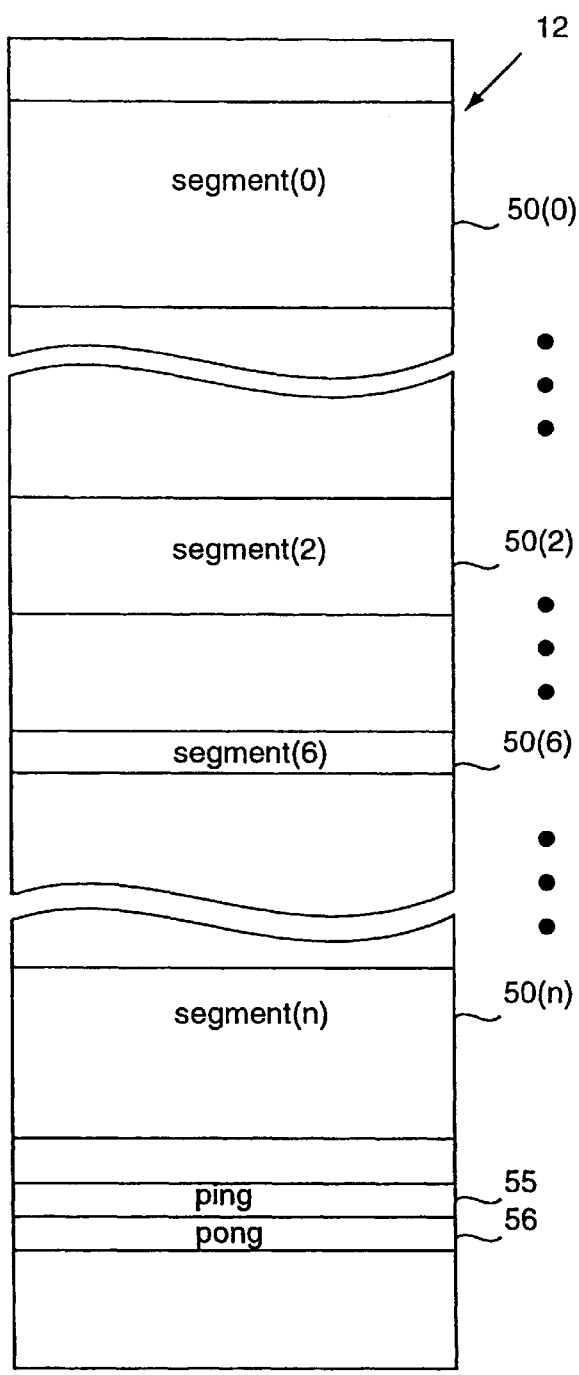
FIG. 3 illustrates a memory map of a main memory of FIGS. 1 or 2.
Figures 4, 5:
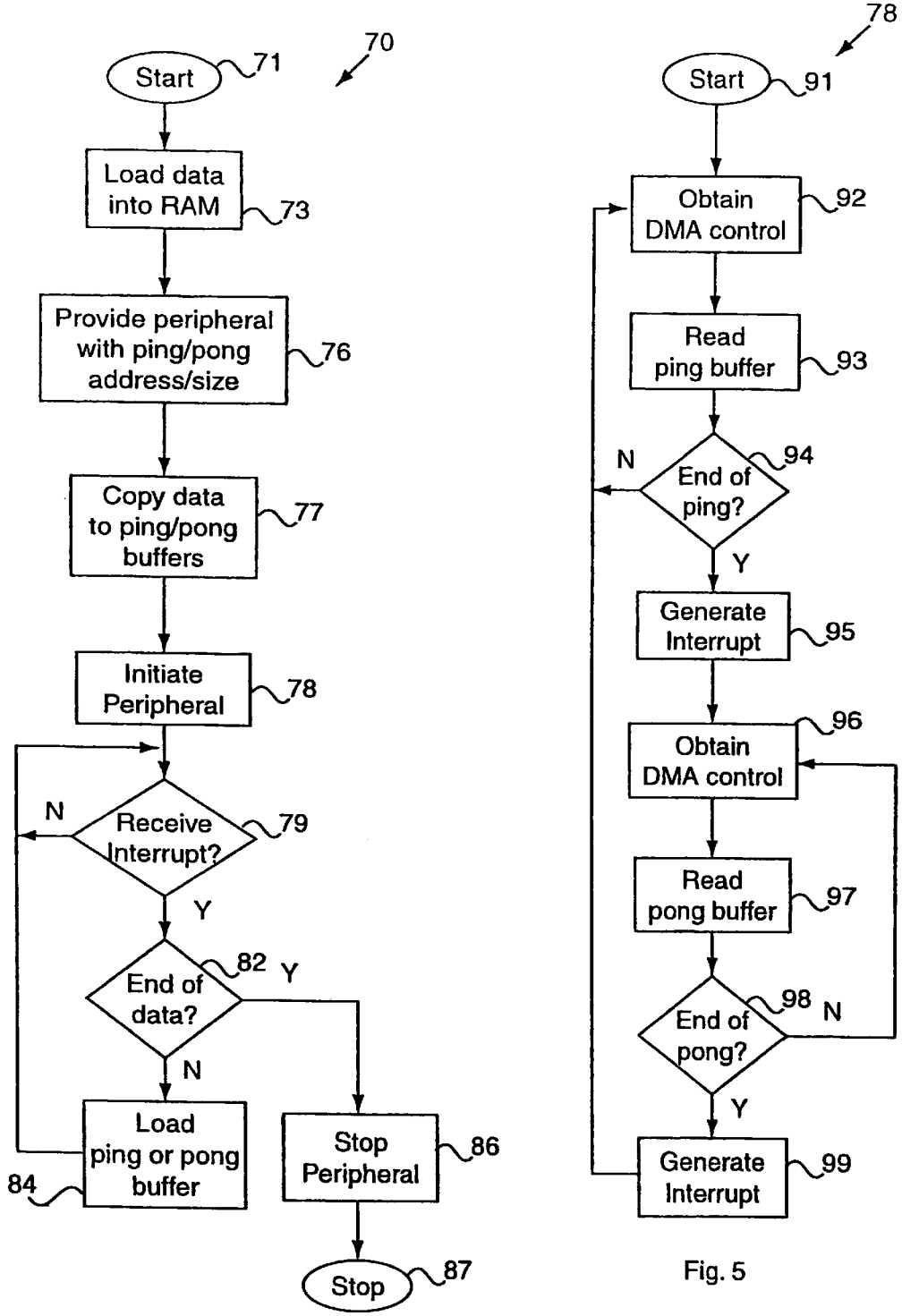
FIG. 4 is a diagrammatic flow chart describing a DMA transfer utilizing ping and pong buffers.
FIG. 5 is a diagrammatic flow chart further describing a DMA transfer utilizing ping and pong buffers.
Figure 6:
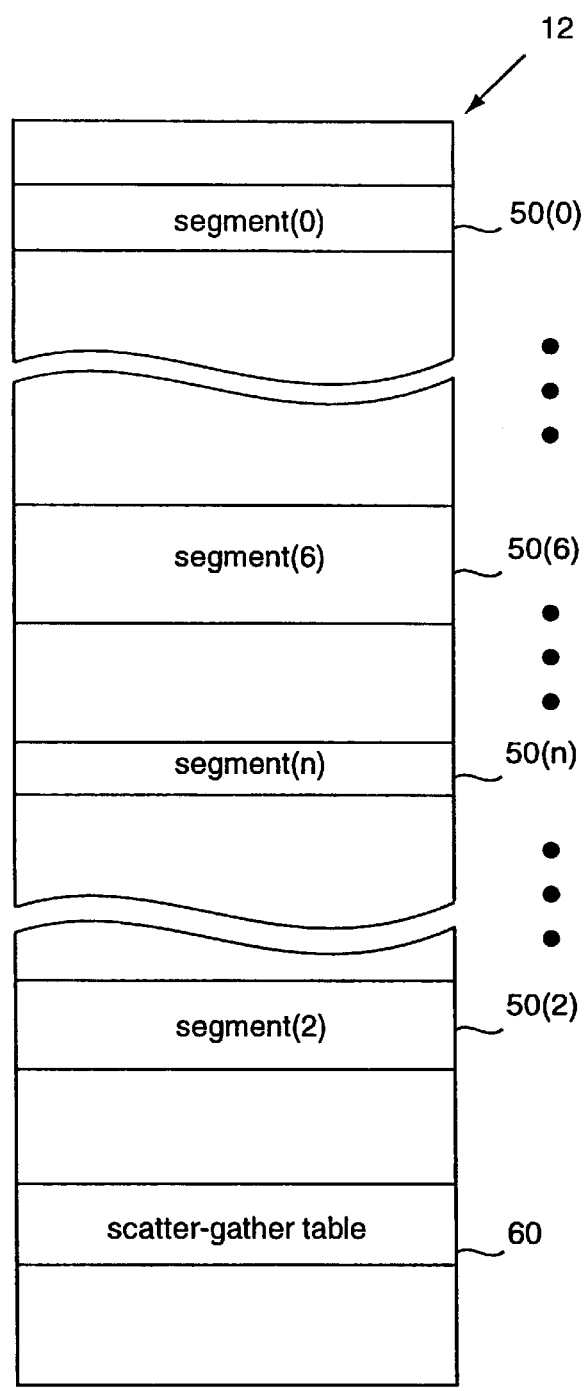
FIG. 6 illustrates an alternate memory map of the main memory of FIG. 2.
Figure 9:
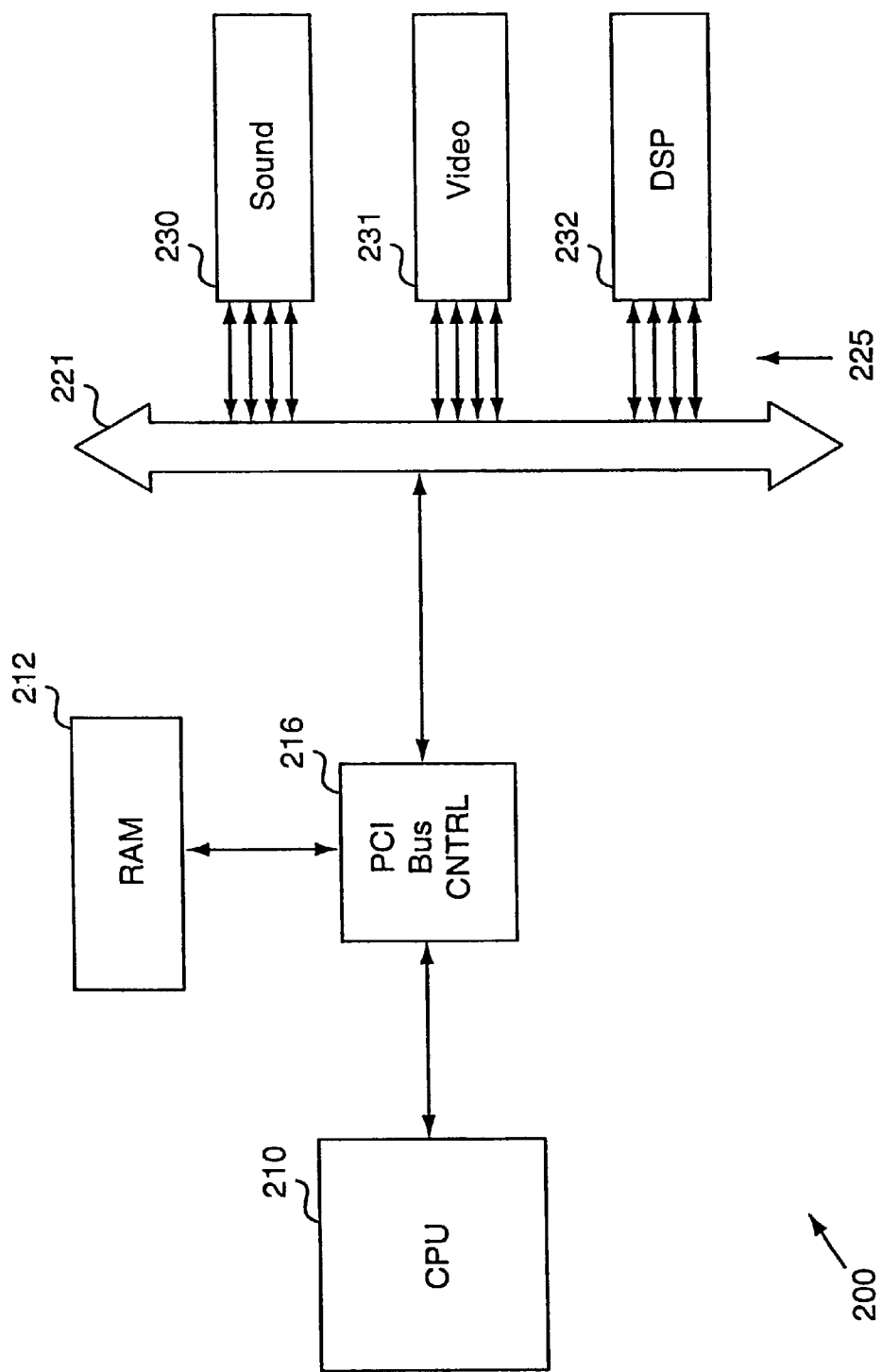
FIG. 9 is a diagrammatic block diagram of a computer system utilizing multiple DMA channels, in accordance with one embodiment of the present invention.

FIG. 9 is a block diagram of a computer system 200 utilizing multiple DMA channels 225. Computer system includes a CPU 210, a main memory 212, a PCI bus controller 216, a PCI bus 221 and peripherals 230–232. In one embodiment of the present invention, peripheral 230 is an audio processing peripheral. However, the present invention is applicable to all types of peripheral devices. By way of example, the particular peripheral may be a video processing device, digital signal processing device, 3-D graphics processing device, network interface device, modem device, prior art non-PCI bus controller device (for providing legacy support, as is known in the art), memory device or any other type of peripheral device.

PCI bus controller 216 allows peripherals 230–232 to be the masters of PCI bus 221. Unlike the prior art computer systems, in the present invention peripherals 230–232 establish and maintain multiple DMA channels 225 per peripheral device. The use of multiple DMA channels 225 for a single peripheral device effectively eliminates the bandwidth ceiling of PCI bus 221.

For purposes of exemplary illustration the operations of an audio processing peripheral is discussed. Audio processing peripheral 230 utilizes multiple DMA channels for a variety of reasons. In particular, the use of multiple DMA channels allows real-time operations of multiple audio channels. In prior art systems the number of individual audio channels or voices that were capable of being processed in real-time was limited by the bandwidth of the prior art buses and the typical requirement of establishing a new DMA channel for another audio channel or voice only after the successive DMA channel has been terminated.

In one embodiment of the present invention, audio processing peripheral 230 is capable of utilizing as many DMA channels for any number of audio channels or voices simultaneously as needed. In another embodiment, audio processing peripheral 230 utilizes one DMA channel for each audio channel or voice. Thus, multiple voices are capable of being processed at the same time. In an alternative embodiment, audio processing peripheral 230 is capable of establishing up to 48 DMA channels simultaneously.

The ability to establish and maintain multiple DMA channels, while elegant, requires careful organization and planning. Having multiple DMA channels potentially increases the chances of conflicts over which DMA channel may have access of the bus. Thus, management is required in order to limit latency problems that may affect real time performance.

The present invention solves the problem by providing buffering for each DMA channel in the peripheral device. However, buffering is kept to a minimum by having adjustable trigger levels for access to the bus corresponding to the data rate required of the DMA channel. Also, the DMA channels are prioritized, such that the most critical DMA channel is given priority over lower rate DMA channels.

Another problem associated with multiple DMA channels is the need to reduce latency problems. Multiple sub-buffers containing the locations of the next pieces of data in main memory for each DMA channels effectively solves the problem of latencies during the time the peripheral waits for access to main memory. Multiple sub-buffers allows the peripheral to continue to obtain data from the next block of data from main memory while the peripheral waits for updated addresses from the CPU.

Interruptions in any DMA channel, due to allowing another DMA channel to have access to the bus, is another problem associated with multiple DMA channels. By having the peripherals master the transfer of data, the peripherals are able to individually track the progress of a DMA channel without having to burden the CPU.

Thus, the present invention further encompasses a unique and advantageous method and apparatus of establishing and maintaining a DMA channel. Further, one aspect of the present invention is suitable for establishing and maintaining a single DMA channel that may be more efficient than prior methods of establishing and maintaining DMA channels, as discussed further in reference to FIGS. 10, 11 and 12.

Figure 10:
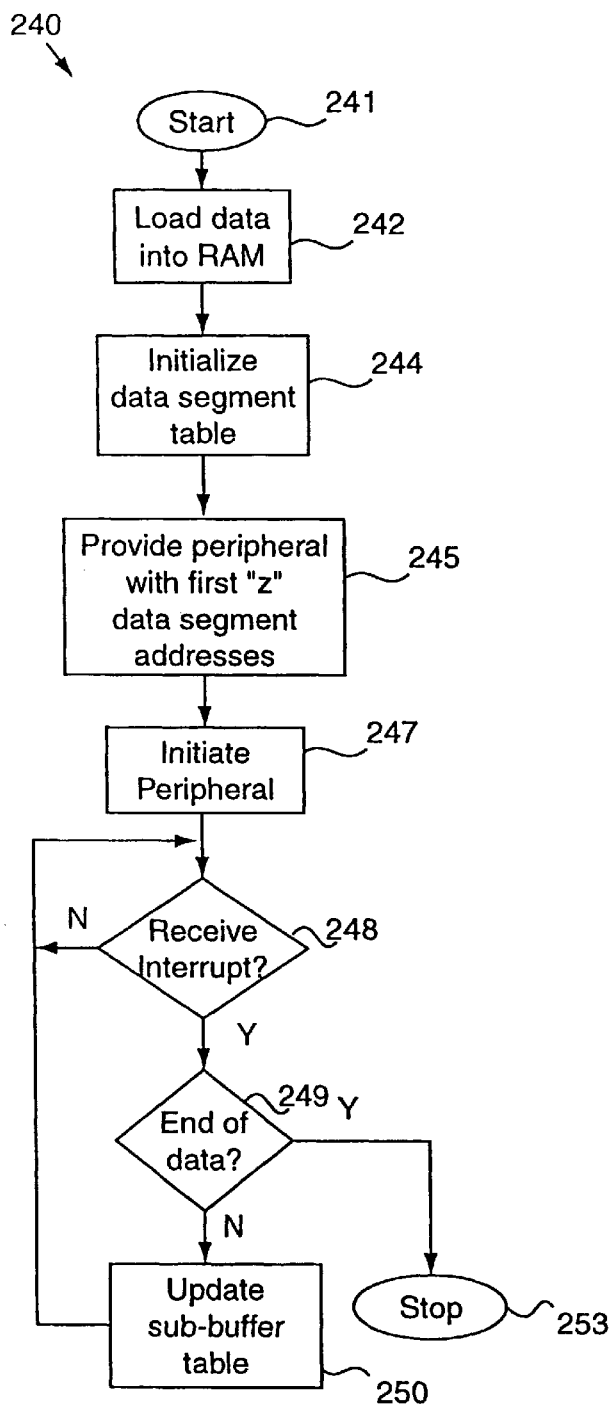
FIG. 10 is a diagrammatic flow chart of the operations of a CPU for one of multiple DMA channels, in accordance with one embodiment of the present invention.
Figure 11:
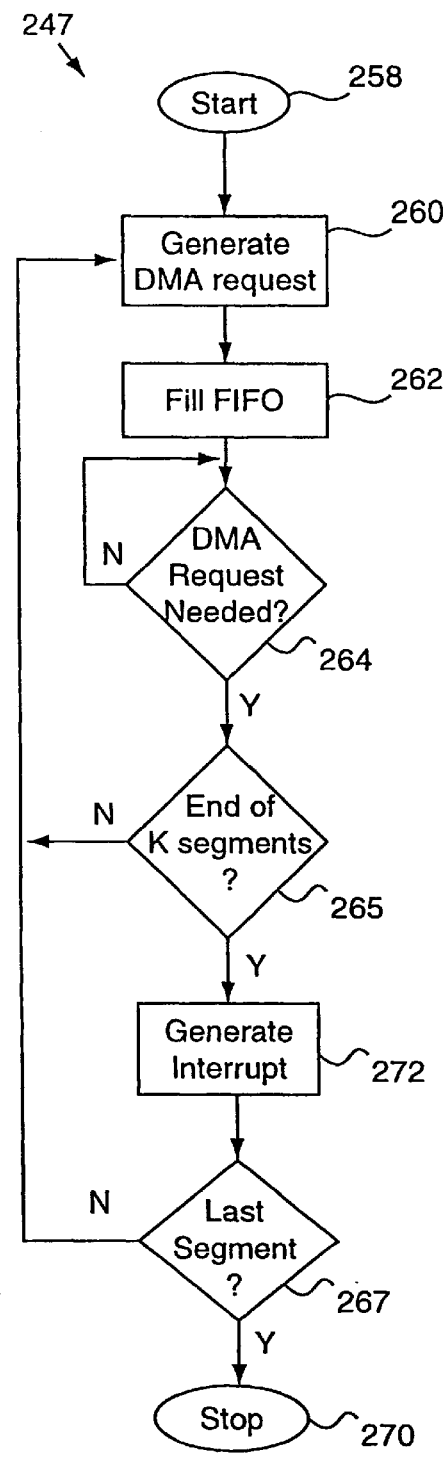
FIGS. 11 is a diagrammatic flow chart of the operations of an audio processing peripheral for the DMA channel discussed in reference to FIG. 10, in accordance with one embodiment of the present invention.
Figure 12:
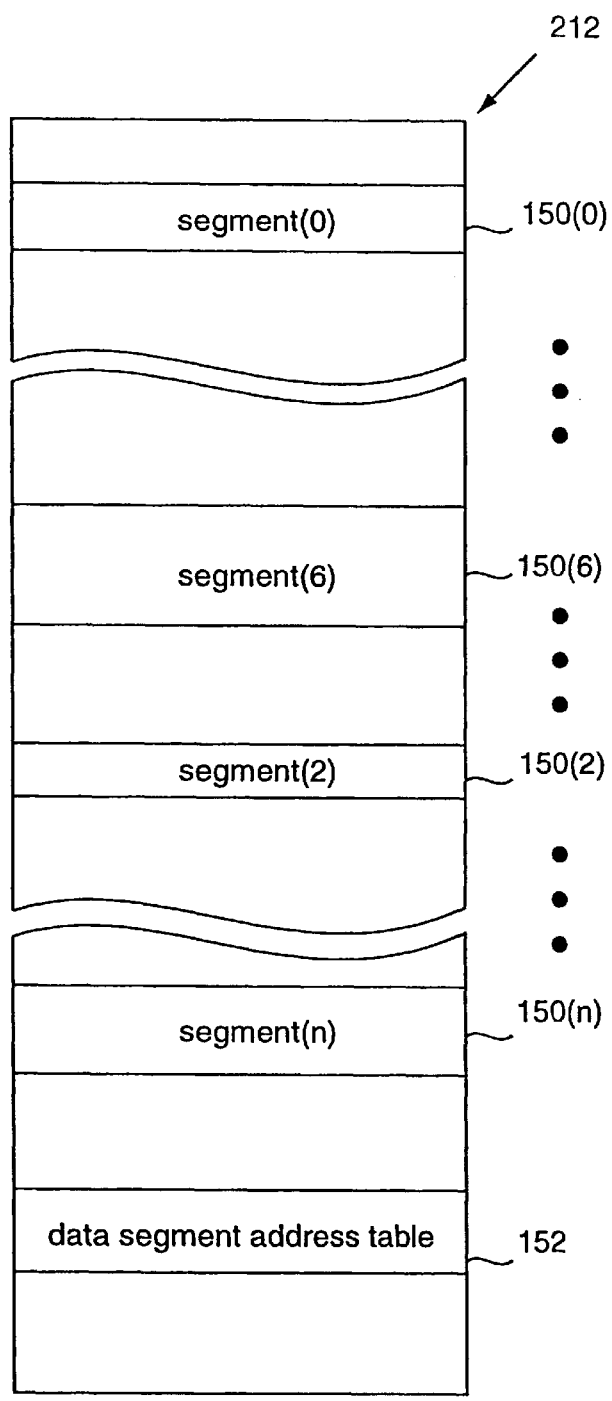
FIG. 12 illustrates a memory map of a main memory corresponding to one of the multiple DMA channels, in accordance with one embodiment of the present invention.

FIGS. 10 and 11 are diagrammatic flow charts of the operations of CPU 210 and audio processing peripheral 230 for one of the multiple DMA channels, respectively, in accordance with one embodiment of the present invention. FIG. 12 is a memory map of main memory 212 corresponding to one of the multiple DMA channels, in accordance with one embodiment of the present invention. Main memory 212 typically contains a requested block of data 150 dissected into data segments 150(0)–150(n), as discussed further below. Main memory 212, in one embodiment, may include a data segment address table 152. In another embodiment, the peripheral may perform the functions of a data segment address table.

In the exemplary embodiment, CPU 210, under the direction of an audio driver, typically follows a flow 240. In block 241 the audio driver is implemented on CPU 210 and typically triggered by a request for audio data. CPU 210 retrieves requested data 150 and places it in main memory 212, in block 242, from a data source. Typically, data 150 is segmented into data segments 150(0)–150(n). As discussed, data segments 150(0)–150(n) may be segmented into any number and size in main memory 212.

After data 150 has been appropriately transferred to main memory from a data source, in block 244, CPU 210 creates and initializes data segment address table 152 within main memory 212. Data segment address table 152 typically contains the physical addresses and sizes of data segments 150(0)–150(n) in main memory 212. In one embodiment, data segment address table 152 contains the addresses and sizes of all data segments 150(0)–150(n). In the exemplary embodiment, data segment address table 152 contains information about the first "m" data segments 150(0)–150(m).

In block 245, CPU 210 provides audio processing peripheral 230 with information about the first "z" data segments 150(0)–150(z) (where z<m<n). Generally, the audio driver provides audio processing peripheral 230 with information about the first "z" data segments as a method of sub-buffering, as discussed further herein. Unlike the prior art ping and pong system, CPU 210 is not required to continually copy data segments 150(0)–150(n) from main memory 212 to a ping or pong buffer. Additionally, the present invention does not require audio processing peripheral 230 to access a scatter-gather table each time a new data segment is retrieved, requiring multiple DMA accesses. The variable "z" may be any number greater than one for the purposes of maintaining a DMA channel. Typically, a value of 3 or greater provides for more versatility and reducing system interrupt latencies. However, the value of "z" increases, audio processing peripheral 230 requires greater resources.

In the illustrated embodiment, "z" is equal to 4. Thus, in block 245 CPU 210 provides audio processing peripheral 230 with information about the first four data segments 150(0)–150(3). Peripheral 230 is then initiated in block 247. CPU 210 then goes into a wait state, in block 248, until an interrupt is generated by the operations of audio processing peripheral 247.

Referring to FIG. 11, flow chart 247 begins at block 258 where the peripheral is instructed to establish a DMA channel with the appropriate information. In block 260, peripheral 230 interprets the addresses and sizes of data segments 150(0)–150(3) and establishes a sub-buffer table with the information. Details of the sub-buffer table are discussed in greater detail below. Additionally, a first-in-first-out (FIFO) buffer is established for the DMA channel. Then a DMA request is generated in order to begin filling the FIFO buffer with data from the first data segment 150(0) using the information provided by CPU 210.

Once PCI bus controller 216 hands over control of PCI bus 221 to audio processing peripheral 230, the peripheral moves to block 262. Peripheral 230 accesses data segment 150(0) in main memory 212. Peripheral 230 obtains as much data from data segment 150(0) as needed to fill the FIFO buffer. Using the data stored in the FIFO buffer peripheral 230 proceeds to process the data in real-time.

At the same time, in block 264 audio processing peripheral 230 monitors the amount of data left in the FIFO buffer in order to determine if another DMA access is required. When a trigger level is reached in the FIFO buffer, a DMA access is requested by the FIFO controller. The FIFO buffer may be any suitable size capable of handling bus latencies while small enough such that the memory requirement is not overly burdensome. In one embodiment of the present invention, the FIFO buffer is 32 samples or words in depth, which would withstand a maximum bus latency of about 4 microseconds. By way of example, if 48 DMA channels trigger simultaneously, with a trigger level set at half the buffer size (16 samples), each DMA channel can wait 16 samples (20 microseconds per sample), or approximately 320 microseconds before running out of data. Thus, the 48th DMA channel can wait more than 4 microseconds for each of the 47 DMA channel request that comes before it.

Additionally, the trigger level may be set at any appropriate level to maintain enough data in the FIFO buffer to continue real-time operations while attempting to refill the FIFO buffer. In one embodiment, the trigger level is set at half the size of the FIFO buffer. Raising the trigger level allows us to withstand higher PCI bus latencies, but increases the percentage of PCI bus utilization.

Before generating another DMA request, peripheral 230 checks in block 265 to see how many of data segments 150(0)–150(3) have been read. If the first "k" data segments of the first four data segments have been read then audio processing peripheral 230 may need to obtain information about successive data segments 150(4)–150(n). The variable "k" is a positive integer less than or equal to "z" ("z" in the exemplary embodiment is four). In one embodiment, "k" is equal to half of "z", or two in the exemplary embodiment. Thus, if the first two data segments have been retrieved, then audio processing peripheral 230 interrupts CPU 210 to obtain further data segment information. Peripheral 230 decides whether to interrupt CPU 210 based upon information stored in the sub-buffer table. Each entry in the sub-buffer table for each data segment 150(0)–150(3) contains an interrupt enable flag.

CPU 210, in the background (not shown), periodically checks the sub-buffer table and determines if any of the data segments have been completely transferred. The CPU updates the sub-buffer table on its own upon determining if any of the data segments have been completely transferred.

In the exemplary embodiment, peripheral 230 sets the interrupt enable flag in the second of the four data segments in order to trigger an interrupt in the instance where the CPU fails to adequately poll the sub-buffer table. The CPU reinitializes the interrupt enable flags with each update. When the last data segment 150(n) is entered in the subbuffer table it is desired to finish reading all the data segments (e.g., 150(n–3)–150(n)) rather than interrupting CPU 210 for more information. And, the interrupt enable flag of the last data segment 150(n) is set by either the CPU or the peripheral.

If audio processing peripheral 230 has not read the first two data segments, peripheral 230 returns to block 260. In blocks 260 to 265 peripheral 230 continues to fill the FIFO buffer with data from the first data segment 150(0) until it is exhausted. Peripheral 230 then proceeds to retrieve the contents of the next data segment, 150(1), using the information stored in the sub-buffer table. After the second data segment 150(1) has been read, audio processing peripheral 230 proceeds from block 265 to block 272 since half of the four data segments have been read. In block 272 the peripheral generates an interrupt, and the process proceeds to block 248 of FIG. 10. The operations of the peripheral proceed to block 267 to determine if the last data segment has been transferred. If not, operations loop back to block 260.

In block 267 peripheral 230 determines if the process of generating an interrupt was initiated by the reading of the last data segment, 150(n), or from a routine updating situation. Assuming that a routine updating interrupt is desired, peripheral 230 proceeds to block 272 and generates an updating interrupt.

Referring back to FIG. 10, CPU 210 is in block 248 waiting for an interrupt from audio processing peripheral 230. When the interrupt is received CPU 210 proceeds to block 249 and determines if the interrupt is an updating interrupt or an end of data segment interrupt. If the interrupt is an updating interrupt, in one embodiment, CPU 210 proceeds to block 250 to update data segment address table 152. As mentioned, data segment address table 152 may already contain information about all the data segments 150(0)–150(n). In an alternate embodiment, where data segment address table 152 contains only a portion of the information about data segments 150(0)–150(n), information about the data segments that have already been provided to peripheral 230 is replaced with information about successive data segments not already included in data segment address table. As can be appreciated, a tradeoff between memory requirements for data segment address table 152 and the burden on CPU 210 is involved, however, the present invention provides the versatility to select a position between the two extremes.

Assuming in the illustrative example that data segment address table 152 contains information about all data segments 150(0)–150(n), CPU 210 merely updates the information about the next data segments in block 250. CPU 210 accesses audio processing peripheral 230 to determine how many data segment entries in the subbuffer table have been successfully read. CPU 10 then refreshes the sub-buffer table with information about the next data segments, in the illustrative embodiment data segments 150(4) and 150(5). After updating peripheral 230, CPU 210 returns to the wait state in block 248.

During the time that CPU 210 is updating the sub-buffer table in peripheral 230, the peripheral continues to operate, referring back to FIG. 11. The number of subbuffers or data segments that audio processing peripheral 230 maintains is determined such that peripheral 230 may continue to perform reads from main memory 212 and real-time operations during the time it takes for CPU 210 to update the sub-buffer table.

Thus, in the illustrative example, peripheral 230 has continued to download data segments 150(2)–150(3) while it is being updated by CPU 210. The process continues until the last data segment 150(n) has been read into the FIFO buffer. In block 272 peripheral 230 generate a final interrupt. The final interrupt is recognized by the CPU as the final interrupt since the CPU knows that data segment 150(n) is the last data segment. After generating the interrupt, the operations proceed to block 267 and then to block 270 after determining that the last data segment has been read. The operation of peripheral 230 ends in block 270, with regard to that particular DMA channel.

Referring back to FIG. 10, the end of the data interrupt generated in block 268 is received by CPU 210 in wait state block 248, and CPU 210 proceeds to block 249. From block 249 CPU 210 proceeds to block 253 since the interrupt was an end of data interrupt. In block 253 the operations of CPU 210, as directed by the audio driver, ends with respect to that particular DMA channel.

During the entire process described, other DMA channels are simultaneously running between main memory 212 and peripheral 230. Simultaneous multiple DMA channels are capable since CPU 210 is not overly burdened with continuously shifting data from one location to another within main memory 212. Especially in the exemplary embodiment where data segment address table 152 contains information about all data segments 150(0)–150(n) at one time, CPU 210 need not even keep tabs on data segment address table 152. Thus, CPU 210 simply periodically updates the sub-buffer table of audio processing peripheral 230, and only when necessary. At the same time, audio processing peripheral 230 has in hand the locations and sizes of the most pertinent data segments at all times so that peripheral 230 need not initiate an extra DMA request in order to access a scatter-gather table located in main memory 212. By having CPU 210 periodically update peripheral 230, no additional DMA request is necessary. Also, an update operation initiated by CPU 210 is typically quicker than the DMA request routine of a peripheral.

In another embodiment of the present invention, the requests for DMA accesses by the multiple DMA channels are prioritized. As can be appreciated, while multiple DMA channels are actively established between main memory 212 and audio processing peripheral 230, only one DMA channel may be active at any one time. Thus, audio processing peripheral 230 may prioritize the urgency of the various PCI or bus requests generated by each DMA channel. Typically, DMA channels involving faster data rates are given priority over slower data rate DMA channels, as the slower DMA channels can tolerate longer latencies for their requests.

As stated, the foregoing is a description of an exemplary embodiment as applied to an audio processing peripheral. Similar operations can be utilized with varying types of peripheral devices, and not necessarily limited to those enumerated. Future types of peripheral devices may also take advantage of the present invention disclosed.

To further describe in detail the present invention in relation to an apparatus, another illustrative embodiment is disclosed below. Referring to FIGS. 13–18, an audio processing peripheral 230 in accordance with the present invention is disclosed.

Figure 13:
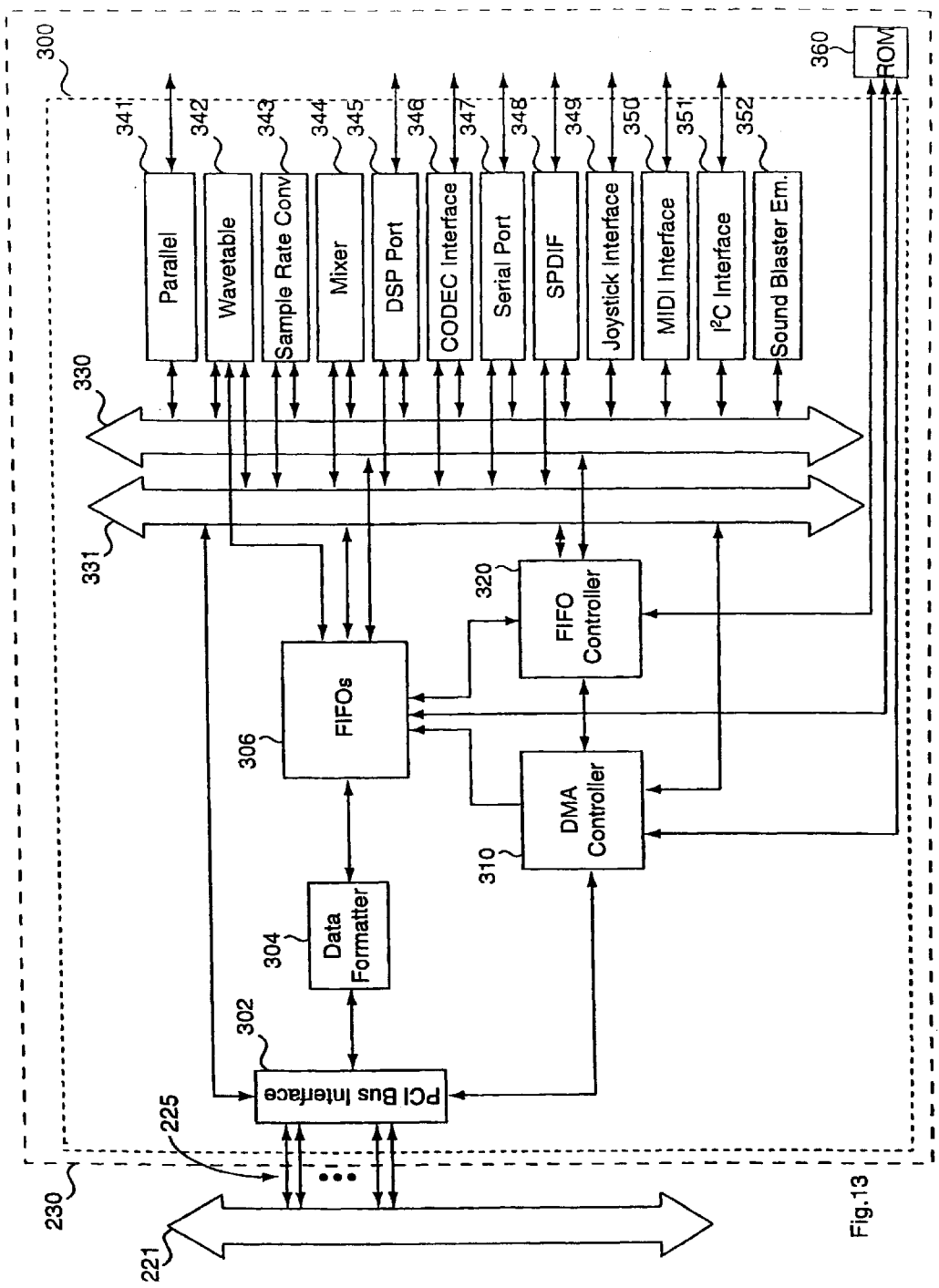
FIG. 13 is a block diagram of an audio processing peripheral, in accordance with one embodiment of the present invention.

FIG. 13 is a block diagram of an audio processing peripheral 230, in accordance with one embodiment of the present invention. Audio processing peripheral 230 includes an audio processing device 300. Audio processing device 300 is typically coupled to PCI bus 221. Multiple DMA channels 225 may be established between audio processing device 300 and main memory 212 through PCI bus 221 (see FIG. 9). Audio processing device 300 includes a PCI bus interface 302, a plurality of FIFOs 306, a DMA controller 310, a FIFO controller 320, an internal data bus 330, a register bus 331 and operational components 341–352.

Operational components 341–352 may be typical audio processing blocks that conduct real-time operations on the data retrieved through multiple DMA channels 225 established by device 300. By way of example, operational components may be a parallel port interface 341, a wavetable 342, a sample rate converter 343, a mixer 344, a digital signal processor interface 345, a coder/decoder interface 346, a serial port interface 347, a Sony/Phillips Digital Interface Format (SPDIF) 348, ajoystick interface 349, a musical instrument digital interface (MIDI) interface 350, a Phillips I²C protocol interface 351 and a prior art sound card emulator 352. Components 341 and 345–351 may be coupled to the appropriate devices (not shown) which may be included on audio processing peripheral 230. However, any suitable operational component may be utilized in accordance with the present invention. By way of example, A3D, tone controller, crosstalk canceller or any other suitable operational component may be incorporated.

Prior art sound card emulator 352, in one embodiment, may be a frequency modulation emulator as described in further detail in co-pending U.S. patent application Ser. No. 08/893,148, entitled "METHOD AND APPARATUS FOR EMULATING A FREQUENCY MODULATION DEVICE", Attorney Docket No. ARELP009, filed on Jul. 15, 1997 by inventors Charles J. Cameron and Gary M. Catlin, and assigned to Aureal Semiconductor Inc., which is incorporated herein by reference in its entirety for all purposes.

PCI bus interface 302 allows audio processing device 300 to communicate with CPU 210, PCI bus controller 216 and main memory 212 through PCI bus 221. PCI bus interface 302 typically passes along DMA requests generated by DMA controller 310 to PCI bus controller 216 via PCI bus 221. PCI bus interface 302, under direction of DMA controller 310, retrieves requested data 150 from main memory 212 once control of PCI bus 221 is obtained. Data 150, or more typically data segments 150(0)–150(n), are passed from PCI bus interface 302 to FIFOs 306.

In an alternate embodiment, data segments 150(0)–150(n) are initially passed through a data formatter 304 between PCI bus interface 302 and FIFOs 306 to convert data segments 150(0)–150(n) into the type of data that may be processed by audio processing device 300. As relevant to the exemplary embodiment, data 150 in main memory 212 may be any type of audio data. By way of example, data 150 may be 16-bit linear, 8-bit compressed, mu-Law (uLaw) compressed, A-Law compressed, pulse code modulated, pulse density modulated, ADPCM, MPEG, AC-3, Prologic or in any other type of suitable audio data format. Data formatter 304, converts the incoming data into a format that may be readily processed by audio processing device, such as those listed. In the present exemplary embodiment, data formatter 304 converts incoming data into 16-bit linear format and passes the data to FIFOs 306.

In another embodiment, the present invention is capable of handling multiple DMA channels for writing information to main memory 212 from a peripheral, as discussed further below. In the exemplary embodiment, data formatter 304 may receive 16-bit linear data from FIFOs 306 and convert the data accordingly. The data is then passed on to PCI bus interface 302 to be written to main memory 212. Again, the types of data conversion may include any of the audio data formats enumerated, or any other suitable data formats.

The exemplary embodiment discusses the present invention in relation to audio processing, but is not limited thereto. The present invention may be utilized with any type of data processing performed on a peripheral device. By way of example, network interfacing, video processing, digital signal processing, parallel or serial port interfaces, modem interface, real time data acquisition as well as any other suitable peripherals may be utilized in accordance with the present invention.

FIFOs 306 receive incoming data 150 from data formatter 304, at the rate at which PCI bus interface 302 is capable of retrieving data 150 from main memory 212, during the time PCI bus interface has control of PCI bus 221. FIFOs 306 parse out data 150 for each DMA channel at the data rate of data bus 330 or register bus 331 to facilitate real time operations by components 341–352.

Data bus 330 may be any suitable type of data bus. In one embodiment, data bus 330 is an audio data bus as described in co-pending U.S. patent application Ser. No. 09/082,650, entitled "PROGRAMMABLE BUS", by inventors Edwin E. Everman, III and Gary M. Catlin filed concurrently herewith, and assigned to Aureal Semiconductor Inc., which is incorporated herein by reference in its entirety for all purposes.

Data bus 330 allows communication between FlIFOs 306 and the multiplicity of components 341–352, and amongst components 341–352 themselves. Register bus 331 allows direct communication between CPU 210 and the elements of audio processing device 300 (e.g., PCI bus interface 302, FIFOs 306, DMA controller 310, FIFO controller 320, wavetable 342, sample rate converter 343, mixer 344, DSP port 345, CODEC interface 346 and SPDIF 348). However, register bus 331 may be configured to communicate with any or all the elements of audio processing device 300. In an alternate embodiment, the functions of data bus 330 and register bus 331 may be incorporated into a single bus within audio processing device 300.

FIFOs 306 include a number of individual FIFOs 306(0) –306(x). The number of FIFOs 306 corresponds to the number of potential DMA channels that may be established between main memory 212 and audio processing peripheral 230. In the exemplary embodiment, there are forty-eight FIFOs 306(0)–306(47). However, any number of FIFOs corresponding to the number of DMA channels desired may be utilized in accordance with the present invention.

FIFO controller 320 maintains FIFOs 306. FIFO controller 320 monitors the input and output of data from FIFOs 306. FIFO controller 320 also monitors the trigger levels of FIFOs 306, which is set by the CPU under the direction of the driver. When a trigger level is reached by one of FIFOs 306, FIFO controller 320 passes along a request for a DMA access for the appropriate DMA channel to DMA controller 310.

DMA controller 310 manages the multiple DMA channels established with main memory 212. DMA controller 310 maintains a sub-buffer table for each DMA channel in order to keep track of data segments 150(0)–150(n) corresponding to a particular DMA channel. DMA controller 310 is in communication with CPU 210 through register bus 331 such that CPU 210 can update the sub-buffer tables.

DMA controller 310 receives signals from FIFO controller 320 indicating that one or more FiFOs 306 require a DMA access for one or more DMA channels. DMA controller 310 also prioritizes the requests for DMA access among the various DMA channels and corresponding FIFOs 306. The method of prioritizing, as discussed further below, is typically based upon the data rates of the DMA channels. In alternate embodiments, prioritization may be conducted based upon other factors. By way of example, prioritization may be conducted based upon the order in which the DMA channels are established, the data format of the requested data, priorities assigned by the requesting application or any other suitable criteria.

After a DMA request has been successfully sent and answered, DMA controller 310 controls the input of the retrieved data into FIFOs 306. In an alternative embodiment, where audio processing peripheral 230 is writing data to main memory 212, DMA controller 310 controls the output of data from FIFOs 306 to main memory 212.

Figure 14:
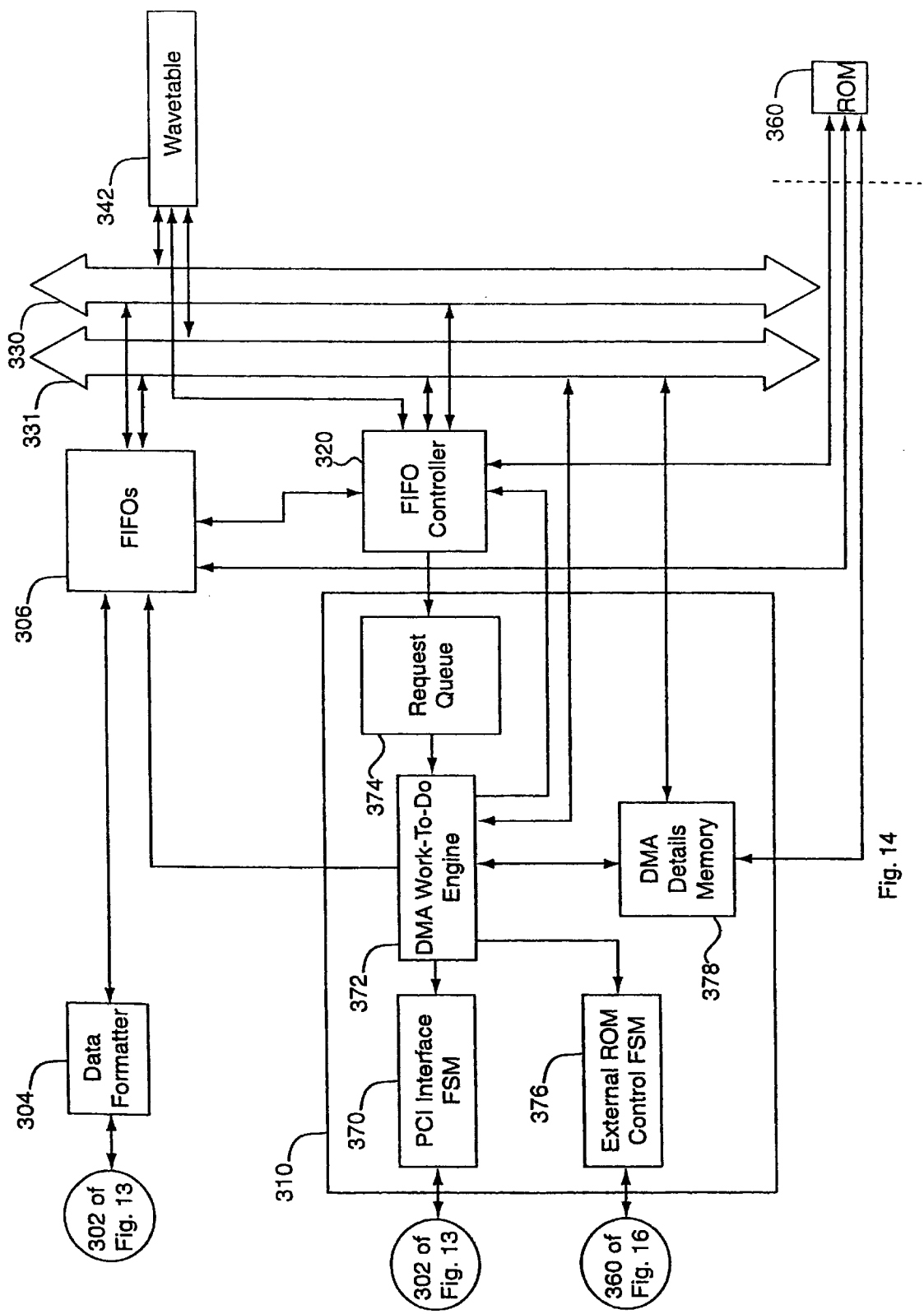
FIG. 14 is a diagrammatic block diagram of a DMA controller of FIG. 13, in accordance with one embodiment of the present invention.

FIG. 14 is a diagrammatic block diagram of DMA controller 310 of FIG. 13. DMA controller 310 includes a PCI interface finite state machine (FSM) 370, a DMA work-to-do engine 372, a request queue 374, a DMA details memory 378 and an external ROM control FSM 378.

DMA engine 372 directs the flow of operations of DMA controller 310. Typically, when a DMA channel is first initiated DMA engine 372 receives the relevant information about data segments 150(0)–150(n) of the requested data 150 for the particular DMA channel via register bus 331. DMA engine 372 processes the information about data segments 150(0)–150(n) and stores the information in DMA details memory 378. DMA engine 372 also updates FIFOs 306 to handle another DMA channel based upon requests from the FIFOs. The FIFOs are initially set up by the CPU under the direction of the driver.

After the DMA channel is running, FIFO controller 320 will typically inform DMA controller 310 that the DMA channel requires a PCI bus access. The request is normally received by request queue 374, where it is prioritized according to the appropriate priority criteria. The most urgent DMA request corresponding to one of multiple DMA channels 225 is provided to DMA engine 372. DMA engine 372 generates a DMA request packet and passes it along to PCI interface FSM 370. With the DMA request packet, PCI interface FSM 370 instructs PCI bus interface 302 to request access to PCI bus 221 and retrieve the appropriate data segment from main memory 221 (see FIG. 9). At the same time, DMA engine 372 updates the information in DMA details memory 378 associated with the DMA channel.

FIG. 15a is a diagrammatic block diagram of DMA details memory 378. DMA memory 378 includes a number of sub-buffer tables 380(0) through 380(x). The number of sub-buffers depends on the number of DMA channels that DMA controller 310 is configured to handle. Continuing with the exemplary embodiment, forty-eight channels or more may be processed at any one time.

FIG. 15b is a diagrammatic block diagram of a typical sub-buffer table 380(3) of FIG. 15a. For purposes of illustration, sub-buffer table 380(3) is representative of the fourth DMA channel established. Sub-buffer table 380(3) includes a mode register 382 and a number of data-segment pointers 384(0)–384(3). Mode register 382 contains information pertinent to the type of DMA channel to which it corresponds. Data segment pointers 384(0)–384(3) contain memory addresses about each data segment that is queued up for retrieval from main memory 212. As discussed, any number of data segment pointers may be used, equal to the number of data segments (e.g., 150(0)–150(3)) that are provided to audio processing peripheral 230 at a time. In the exemplary embodiment, four data segment pointers 384(0)–384(3) are utilized.

FIG. 15c is a diagrammatic block diagram of a mode register 382 of sub-buffer table 380(3) of FIG. 15b. Mode register 382 includes a check for fault flag 382(a), a had fault flag 382(b), a data format register 382(c), a read/write flag 382(d), an interrupt enable flag 382(e) and a current position register 382(f).

Referring back to block 250 of FIG. 10, in one embodiment, when CPU 210 updates a sub-buffer table 380(0)–380(x), in relation to a particular DMA channel, CPU 210 checks mode register 382. In an alternate embodiment, CPU 210 also periodically checks sub-buffer tables 380(0)–380(x) in addition to any updates initiated by interrupts, as discussed in reference to FIGS. 10 and 11. By way of example, CPU 210 may update-sub-buffer tables 380(0)–380(x) routinely every 10 milliseconds. The periodic checks may be initiated by audio processing peripheral 230 by way of interrupts, or may be scheduled independently by the driver. In another embodiment, the CPU may check a current sub-buffer table (not shown) the indicates the current sub-buffer being utilized by the peripheral. Based upon the current sub-buffer and information about the previous value of the current sub-buffer table the CPU can determine that the peripheral has moved on to the next data segment. CPU 210 may then update the sub-buffer table.

During an update of one or all of sub-buffer tables 380(0)–380(x) CPU 210 checks the appropriate mode registers 382 or current sub-buffer table and its contents. Check for fault flag 382(a) may be set by CPU 210 to allow audio processing device 300 to check for faults. A fault occurs when data in the data segments (e.g., 150(3)–150(6)) being pointed to by data segment pointers 384(0)–384(3) have all been read out (or written to) and none of data segment pointers 384(0)–384(3) have been updated. Should a fault occur, DMA engine 372 may initiate an interrupt to CPU 210 in order to correct the fault.

Typically, check for fault flag 382(a) would be set to allow DMA controller 310 to check for this condition. However, situations exist where it may be desirable to reset check for fault flag 382(a). In one example, it may be desired to loop through the indicated data segments (e.g., 150(3)–150(6)). In that instance, check for fault flag 382(a) is reset and DMA engine 372 does not initiate an interrupt.

Had fault flag 382(b) informs CPU 210 that sub-buffer table 380(3) had a fault, as described above. In one embodiment, DMA engine 372 may still set had a fault flag 382(b) even though check for fault flag 382(a) is reset. CPU 210 may also inspect check for fault flag 382(a), when had a fault flag 382(b) is set, to determine if CPU 210 should be concerned about the fault.

Data format register 382(c) is set by CPU 210 when the DMA channel corresponding to sub-buffer table 380(3) is initially set up. Data format register 382(c) informs audio processing device 300 about the type of data contained in requested data 150. Data format register 382(c), in another embodiment, may also indicate other relevant information about requested data 150, for example, the data rate of requested data 150.

Read/write flag 382(d) indicates whether data is being retrieved from or written to main memory 212. Read/write flag 382(d) is a logical true when audio processing peripheral 230 is retrieving data from main memory 212. Read/write flag 382(d) is a logical false when audio processing peripheral is providing main memory 212 with data. Read/write flag 382(d) is interpreted by DMA controller such that it may be able to correctly direct the flow of data to and from FIFOs 306.

Interrupt enable flag 382(e) is set by CPU 210 to allow DMA engine 372 to generate interrupts for the particular DMA channel. Typically, interrupts are generated by DMA engine 372 to CPU 210 when problems occur or when data segment pointers 384(0)–384(3) require updating. Therefore, interrupt enable flag 382(e) is typically set.

In many situations, interrupt enable flag 382(e) may be desired to be reset. When information about the last data segment 150(n) has been entered into one of data segment pointers 384(0)–384(3) interrupt enable flag 382(e) may be reset. If the last data segment 150(n) is entered into one of the data segment pointers 384(0)–384(3) all of the remaining data 150 would like to be read out from main memory 212 without interrupting CPU 210 for an update since no further updates are necessary.

Another example is when no interrupt may be required for CPU 210 to update data segment pointers 384(0)–384(3). The data rate of the particular requested data 150 may be slow enough that regularly scheduled updates by CPU 210 may be all that is required in order to maintain continuity of operations. In that case, it may be desirable for DMA engine 372 not to interrupt CPU 210 to reduce the burden on CPU 210, and interrupt enable flag 382(f) is reset. It may be appreciated by those skilled in the art, other situations exist where interrupt enable flag 382(e) is reset.

Current position register 382(f) is initially set by CPU 210 when the DMA channel is first established to indicate where to begin reading (or writing) data 150 from main memory 212 within the current data segment (e.g., 150(3)). During the process of retrieving data 150 from main memory 212, DMA engine 372 keeps track of the next location to be read from in the current data segment (e.g., 150(3)). The location of the next piece of data is stored in current position register 382(f). Thus, current position register 382(f) typically contains an offset address relative to the address of the current data segment (e.g., 150(3)).

In another embodiment, mode register 382 includes a ROM flag 382(g). Referring back to FIGS. 13 and 14, audio processing peripheral 230 may include a ROM 360. Typically, ROM 360 includes data relevant to the type of peripheral. In the exemplary embodiment, ROM 360 includes audio data that is commonly used. CPU 210 may then retrieve the more frequently used data from ROM 360 rather than main memory 212. By having the more commonly used audio information on audio processing peripheral 230 less main memory 212 space is required, and the number of DMA transfers may be reduced. Latencies also become predictable, rather than widely depending on system activity, as in prior art PCI systems.

In an alternative embodiment, ROM 360 is in communication with DMA controller 310, FIFOs 306 and FIFO controller 320. DMA controller 310 and FIFO controller 320 control the transfer of data from ROM 360 to FIFOs 306 rather than from main memory 212.

Thus, ROM flag 382(g) indicates that requested data 150 is held in ROM 360. Data segment pointers 384(0)–384(3) then point to ROM 360 rather than main memory 212.

With regard to data segment pointers 384(0)–384(3), FIG. 15d is a diagrammatic block diagram of a data segment pointer (e.g., 384(1)). Data segment pointer 384(1) includes a size value 384(a), an address value 384(b) and a control register 384(c). Size value 384(a) includes the size of the data segment (e.g., 150(3)) pointed to by the particular data segment pointer 384(1). Address value 384(b) includes the main memory address of the data segment (e.g., 150(3)).

FIG. 15e is a diagrammatic block diagram of a control register of FIG. 15d, in accordance with one embodiment. Control register 384(c) includes a sub-buffer enable interrupt flag 384(c)(0), a stop flag 384(c)(1) and a next segment pointer 384(c)(2). Sub-buffer enable interrupt flag 384(c)(0) typically serves a similar function as enable interrupt flag 382(f), except on the data segment level rather than the channel level.

Once audio processing device 310 has finished with a particular data segment (e.g., 150(3)) DMA engine 372 checks sub-buffer enable interrupt flag 384(c)(0) for that data segment 150(3). If sub-buffer enable interrupt flag 384(c)(0) is set then an interrupt is generated.

Generally, when CPU 210 initializes data segment pointers 384(0)–384(3) CPU 210 will set the enable interrupt flag of the appropriate data segment pointer 384(0)–384(3) dependent upon when an update is desired. For example, if data segment pointers 384(0)–384(3) are pointed at data segments 150(0)–150(3), respectively, and an interrupt is desired after data segment 150(1) has been read out, CPU 210 will set sub-buffer enable interrupt flag 384(c)(0) for data segment pointer 384(1). As CPU 210 continues to update data segment pointers 384(0)–384(3) the appropriate sub-buffer enable interrupt flag 384(c)(0) will be set for the appropriate data segment pointer.

However, it should be appreciated that interrupts generated by the peripheral may not be needed at all. As discussed, the CPU, as directed by a driver, may periodically poll the progress of the DMA channels utilized by the peripheral. The periodic polling is used to update the sub-buffer tables of the DMA channels as well. The process discussed in detail with regard to the active interrupts generated by the peripheral, however, can be utilized as a backup in case the CPU fails to actively poll the DMA channels.

Stop flag 384(c)(1) typically indicates whether the data segment pointed to by data segment pointer 384 is the last data segment 150(n). When stop flag 384(c)(1) is set DMA engine 372 will cease operations for the particular DMA channel and the associated FIFO 306 after all the contents of the particular data segment has been read and processed. If stop flag 384(c)(1) is reset then DMA engine 372 may continue to the next data segment in the sequence.

Next segment pointer 384(c)(2) includes a pointer to the next data segment pointer 384(0)–384(3). For example, if the current data segment pointer 384(2) points to data segment 150(9) the next data segment pointer 384(c)(2) may point to data segment pointer 384(0), which points to the next data segment 150(10). The next segment pointer, in the exemplary embodiment, is a two bit value corresponding to the four data segment pointers 384(0)–384(3). The number of bits may be varied according to the number of data segment pointers actually utilized in accordance with the present invention.

Data segment pointers 384(0)–384(3), as illustrated, need not be pointing at data segments 150(0)–150(n) in the same order as data segment pointers are designated (e.g., data segment pointers 384(0)–384(3) pointing to data segments 150(0)–150(3), in successive order) since next segment pointer 384(c)(2) provides enough information for DMA engine 372 to proceed to the next data segment regardless of the order of data segments pointers 384(0)–384(3). Once the DMA engine proceeds to the next data segment, the current sub-buffer table (not shown) is also updated.

CPU 210, thereby, provides DMA engine 372 with the relevant information about a DMA channel during its establishment for audio processing device 310 to start up and maintain the DMA channel. CPU 210 may periodically, or upon interrupt, update the information in DMA details memory 378 to provide information about the next successive data segments to be accessed through the DMA channel.

Figure 16:
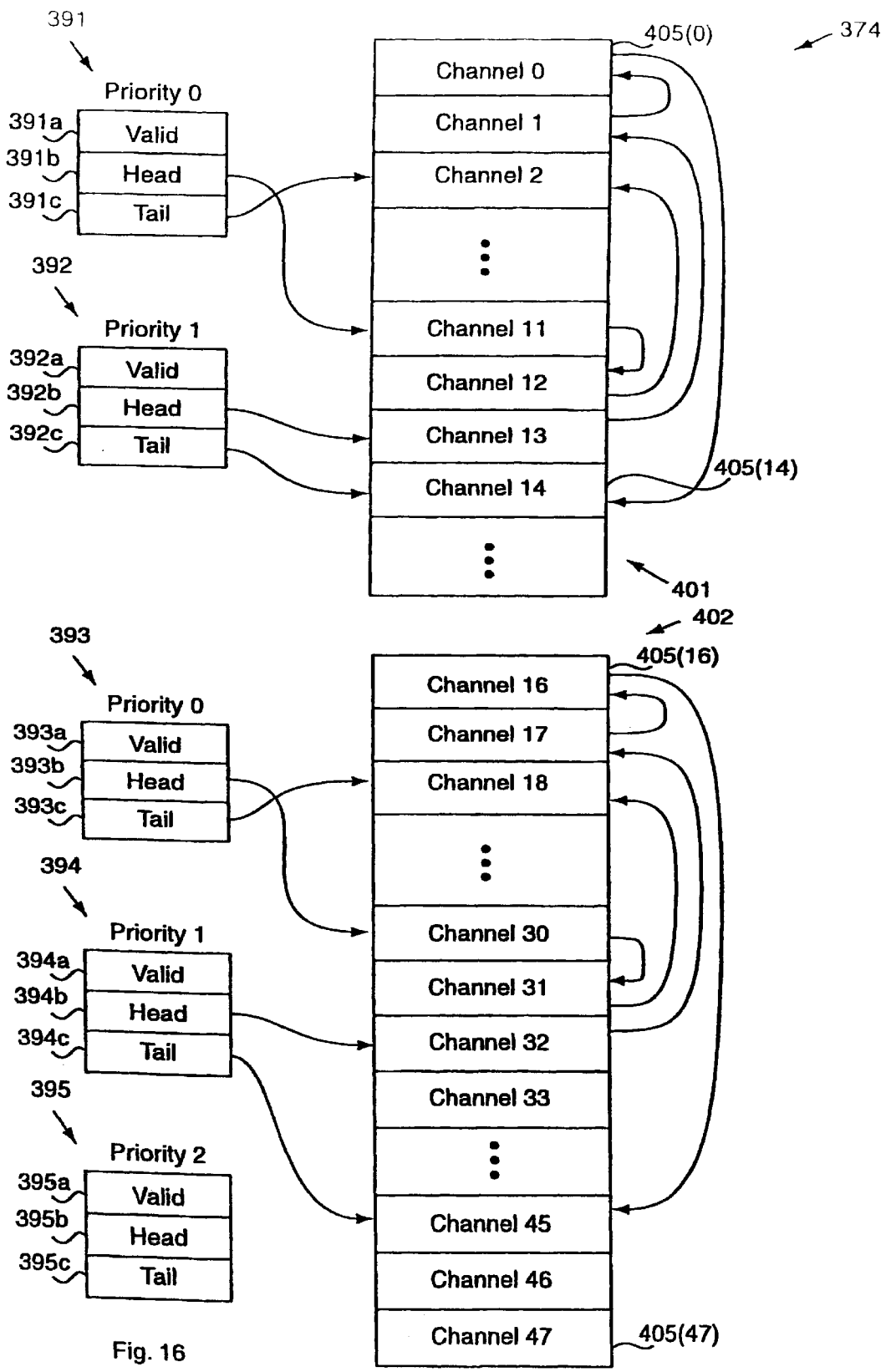
FIG. 16 is a diagrammatic block diagram of the request queue of FIG. 14, in accordance with one embodiment of the present invention.

Referring now to FIG. 16, a discussion of one method of receiving and prioritizing DMA requests from FIFO controller 320 follows, in accordance with one embodiment of the present invention. FIG. 16 is a diagrammatic block diagram of request queue 374 of FIG. 14. Request queue 374 includes one or more queue lists 401 and 402.

In the exemplary embodiment, two queue lists 401 and 402 are utilized. Referring back to FIGS. 13 and 14, in the exemplary embodiment, FIFOs 306 are in communication with data bus 330, register bus 331 and wavetable 342. Wavetable 342 is typically a processing component of audio processing device 300. Wavetable 342 is typically capable of receiving multiple voices or audio inputs and creating a single audio output. Wavetable 342 is also capable of mixing, pitch shifting and amplifying the input voices to produce a desired output.

Wavetables, such as wavetable 342, are commonly used in audio processing. Thus, in the exemplary embodiment, a number of DMA channels are dedicated to wavetable operations. Queue list 401 may be dedicated to conventional DMA channels while queue list 402 may be dedicated to wavetable DMA channels. Correspondingly, a number of sub-buffer tables 380, previously discussed, may be dedicated to wavetable DMA channels without significant alteration from the sub-buffer tables disclosed. Further, some of FIFOs 306 may be dedicated to wavetable DMA channels.

As request queue 374 receives requests from FIFO controller 320, request queue 374 sorts them according to the type of DMA channel. Requests related to wavetable DMA channels are put in wavetable queue list 402. Other requests are put in queue list 401.

Each queue list 401 and 402 also include priority pointers 391–395. Priority pointers 391–395 include a valid register 391a–395a, a head pointer 391b–395b and a tail pointer 391c–395c. Each priority pointer 391–395 corresponds to a level of priority.

Queue list 401 and 402 typically includes one or more linked lists of different priorities. Each linked list corresponds to a level of priority as indicated by priority pointers 391–395. Each linked list includes a number of DMA channel request pointers 405(0)–405(47), one for each DMA channel. Queue list 401 includes channel request pointers 405(0)–405(15) for each conventional DMA channel, and queue list 402 includes request pointers 405(16)405(47) for each wavetable DMA channel. However, each queue list 401 and 402 operate substantially the same.

As illustrated in the exemplary embodiment, queue list 401 has two levels of priority as determined by the number of priority pointers 391 and 392. Thus there are two linked lists of requests. Head pointer 391b points to the first request pointer 405(11) in the linked list of that particular priority. Tail pointer 391c points to the last request pointer 405(2) in the linked list. Intermediately, the request pointers 405(11), 405(12) and 405(2) in the linked list point to each other in succession.

Valid register 391a indicates whether the particular level of priority is valid. For example, if there is no need for more than one level of priority, valid register 391a may be reset to indicate that Priority level 0 is not valid. In one embodiment, each level of priority is considered valid unless there are no pending requests in that particular priority.

When DMA engine 372 is processing DMA requests for transmission to PCI bus controller 216, DMA engine 372 looks at the linked list of the highest priority first. By way of example, Priority level 0 may be the highest level. Thus, in the exemplary embodiment, DMA engine 372 will first satisfy all the DMA requests in the linked list of priority pointer 391. After all the DMA requests in the linked list of priority pointer 391 have been sent, DMA engine 372 proceeds to send DMA requests from the linked list of priority pointer 392.

When more than one request queue 401 and 402 are utilized, as in the exemplary embodiment, DMA requests in linked lists of the same priority in different request queues 401 and 402 are handled alternately. That is, DMA engine 372 handles a DMA request from the linked list of priority pointer 391 followed by a DMA request from the linked list of priority pointer 393, and so on.

In an alternate embodiment, it may be desired that an entire request queue have priority over the other request queue. In that case, the priority pointers of one request queue may be made higher than the priority pointers of the other request queue.

Also, a request queue may be skipped if its valid register indicates it is not valid. If the valid register 391a–395a of a priority pointer is reset, then DMA engine bypasses that priority level in the corresponding linked list.

Figure 17:
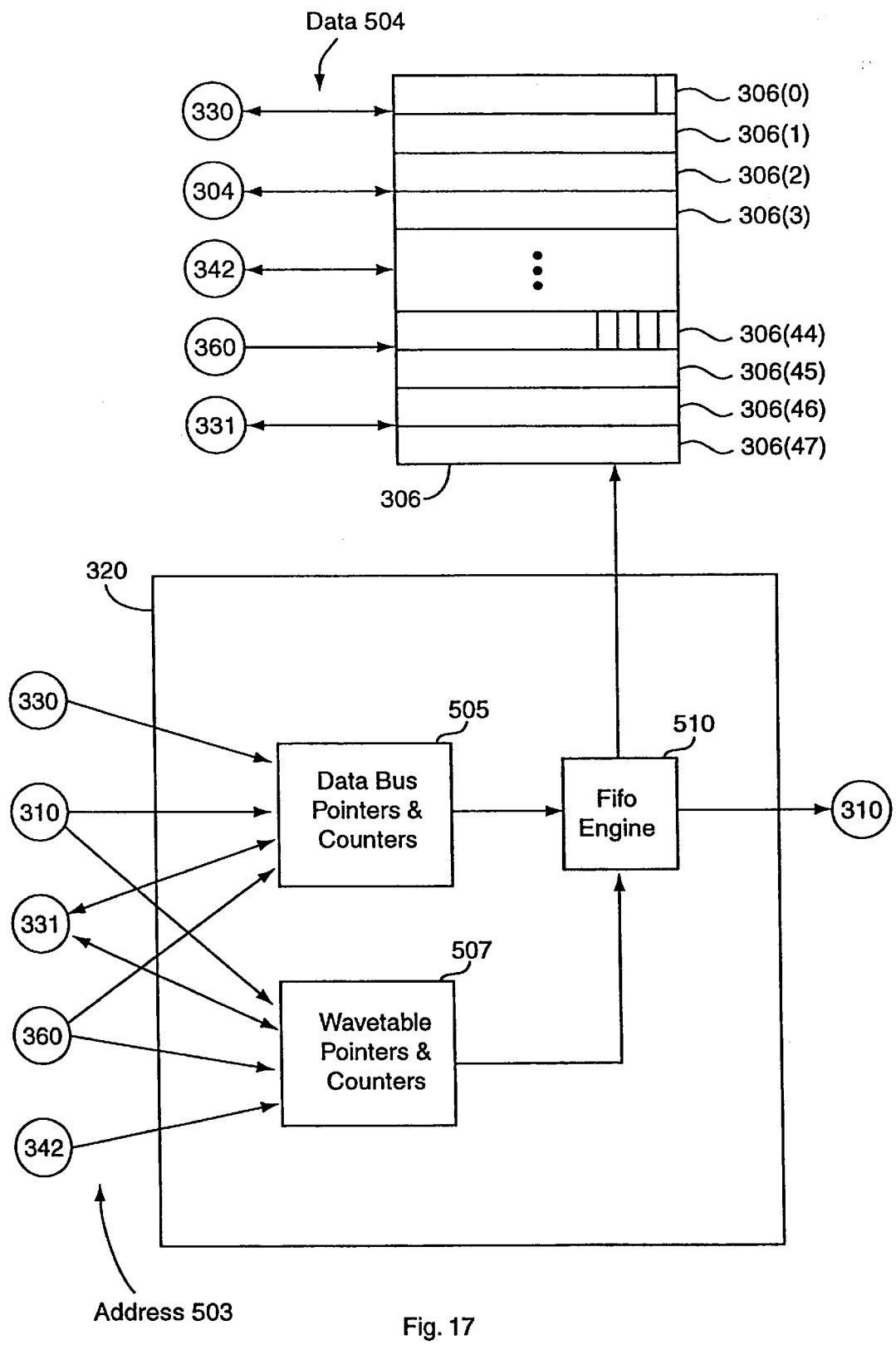
FIG. 17 is a diagrammatic block diagram of the FIFO controller and FIFOs of FIG. 13, in accordance with one embodiment of the present invention.
Figure 18:
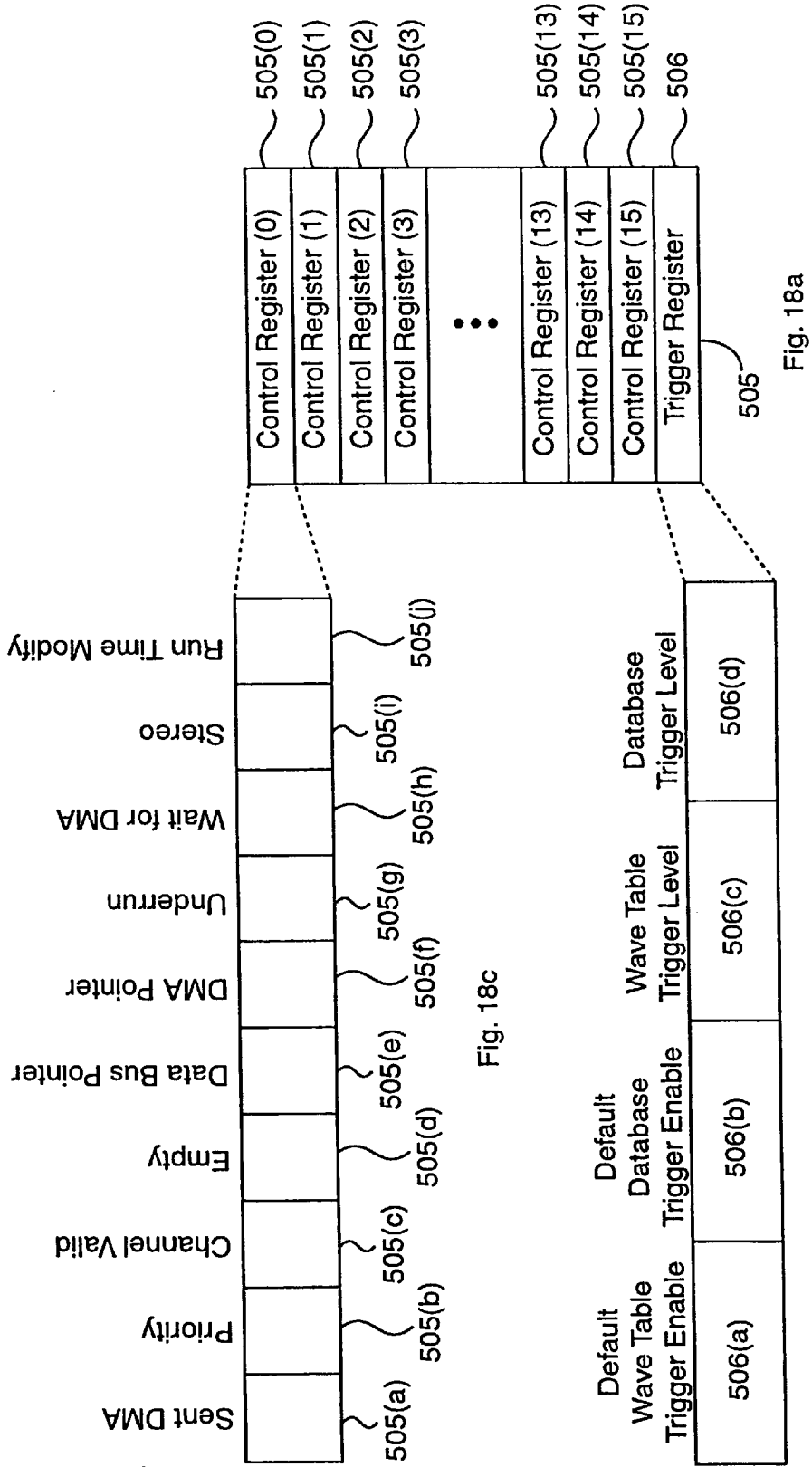
FIG. 18a is a diagrammatic block diagram of a control memory, in accordance with one embodiment of the present invention.
FIG. 18b is a diagrammatic block diagram of a trigger register of FIG. 18a, in accordance with one embodiment of the present invention.
FIG. 18c is a diagrammatic block diagram of a control register of FIG. 18a, in accordance with one embodiment of the present invention.

With regard to the operations of FIFOs 306, FIG. 17 is a diagrammatic block diagram of FIFO controller 320 and FIFOs 306 of FIG. 13. FIFOs 306 includes a number of individual FIFOs 306(0)–306(47). The number of FIFOs 306(0)–306(47) may vary depending upon the number of DMA channels that are desired. In the exemplary embodiment, the number of FIFOs 306(0)–306(47) correspond to 48 DMA channels.

In addition to the variable number of FIFOs in FlIFOs 306, the word depth of each FIFO may also vary. Typically, the word depth of each FIFO 306(0)–306(47) depends upon the data rates of the typical DMA channel. That is, if the system in which audio processing peripheral 230 is operating handles a large number of high data rate DMA channels, the word depth may be accordingly large to ensure that the FIFOs 306(0)–306(47) do not empty before the next DMA request is fulfilled. The word depth of FIFOs 306(0)–306(47) may then be appropriately selected to meet these requirements versus costs and complexity. Additionally, all FIFOs 306(0)–306(47) need not be of the same word depth. The word depths of each FIFO 306(0)–306(47) may be varied to provide greater flexibility. In the exemplary embodiment, each FIFO 306(0)–306(47) has a word depth of 32 words, or samples in the case of audio information.

In the exemplary embodiment, FIFOs 306 is capable of receiving data from data bus 330, data formatter 304, wavetable 342 via direct connection, ROM 360, and register bus 331. At the same time, data bus 330, data formatter 304, wavetable 342 via direct connection, and register bus 331 are capable of retrieving data from FIFOs 306. Generally, any component 341–352 may be able to send and retrieve data to and from FIFOs 306 through data bus 330. And, CPU 210 may be able to communicate with FIFOs 306 through register bus 331.

The control of the flow of data in and out of FIFOs 306 is typically coordinated by FIFO controller 320 and DMA controller 310. FIFO controller 320 includes a control memory 505 and 507. In the exemplary embodiment FIFO controller 320 includes a control memory 507 for the wavetable dedicated DMA channels and a control memory 505 for the non-wavetable dedicated DMA channels. FIFO controller 320 further includes a FIFO engine 510.

When a DMA channel is established, CPU 210 initializes FIFO controller 320 to handle the new DMA channel. CPU 210 typically initializes a portion of one of control memories 505 or 507, depending upon the type of DMA channel being established. For purposes of illustration, a non-wavetable DMA channel will be discussed in further detail.

After control memory 505 has been initialized, as discussed further below, FIFOs 306 are typically written to or read from. FIFO controller 320 may be able to communicate with data bus 330, DMA controller 310, register bus 331, ROM 360 and wavetable 342. In the illustrated embodiment, only register bus 331 is capable of reading from control memory 505. However, in another embodiment, control memory 505 may be configured for two way communication with any element.

In one embodiment, DMA controller 310 may wish to control FIFOs 306 for receipt of data arriving in response to a DMA request. DMA controller 310 communicates to FIFO controller 320 as to which DMA channel, and its associated FIFO, is required to be written to. FIFO engine 510 determines which FIFO 306(0)–306(47) DMA controller 310 wishes to access based upon a FIFO identifier provided by the DMA controller corresponding to the particular DMA channel (e.g., 306(5), corresponding to DMA channel number 5). FIFO engine 510 further determines at which address location in the particular FIFO DMA controller 320 should be writing to by looking up the information in control memory 505 (e.g., 306(5)(14), corresponding to the 15th word space of FIFO 306(5)).

Typically, the element desiring a transfer of information with FIFOs 306 provide address information through address lines 503 to FIFO controller 320. The actual data is transferred to and from FIFOs 306 through data lines 504.

FIFO engine 510 correlates the address information with control memories 505 and 507 and sends the appropriate address to FIFOs 306 to allow access to the appropriate memory location. In the meantime, DMA controller 310 prompts data formatter 304 to provide the incoming data. The process operates similarly for the retrieval of data from FIFOs 306. FIFO controller 320 generally decodes the address provided by the communicating element 330, 310, 331, 360 or 342 and provides the appropriate data from FIFOs 306 to the element. (In the case of DMA controller 310, data is provided to and received from data formatter 342 rather than directly to DMA controller 310.)

Typically, CPU 210 updates control memories 505 and 507 for each new DMA channel that is established. FIG. 18a is a diagrammatic block diagram of control memory 505, in accordance with one embodiment of the present invention. Control memory 505 also is representative of wavetable control memory 507.

Control memory 505 includes a number of control registers 505(0)–505(15). The number of control registers is dependent upon the type of DMA channels that may be handled by audio processing peripheral 230. Each control register 505(0)–505(15) corresponds to a FIFO (e.g., 306(0)–306(15)) in FIFOs 306 that is assigned to the appropriate type of DMA channel. In the exemplary embodiment, 16 of the 48 DMA channels handled by audio processing peripheral 230 may be allocated as nonwavetable DMA channels, as described. Accordingly, the discussion of the control registers apply to the 32 wavetable DMA channels in the exemplary embodiment. However, any proportion of the overall number of DMA channels may be apportioned among the various types of DMA channels that are desired.

Control memory 505 further includes a trigger register 506. FIG. 18b is a diagrammatic block diagram of a trigger register of FIG. 18a, in accordance with one embodiment of the present inventions. Trigger register 506 includes an enable default wavetable trigger flag 506(a), an enable default data bus trigger flag 506(b), wavetable trigger level 506(c) and data bus trigger level 506(d). Trigger register values 506(a)–(d) typically apply to all the DMA channels that are represented by control registers 505(0)–505(15), and their corresponding FIFOs (e.g., 306(0)–306(15)).

Enable default data bus trigger flag 506(b) may be set by CPU 210 during the initialization of audio processing peripheral 230, or during the initialization of a single DMA channel. Typically, enable default data bus trigger flag 506(b) would only be applicable in trigger register 506 of non-wavetable control memory 505, rather than wavetable control memory 507. When enable default data bus trigger flag 506(b) is set, the FIFOs (e.g., 306(0)–306(15)) controlled by control memory 505 are set to trigger a DMA request when a specified number of samples are left in each FIFO. By way of example, the default trigger level may cause one of FIFOs 306(0)–306(15) to trigger a DMA request when the particular FIFO (e.g., 306(0)) is half empty, i.e., 16 samples empty. When enable data bus trigger flag 506(b) is reset, FIFO controller 320 looks to the value in data bus trigger level 506(d) to determine when to trigger a DMA request. Data bus trigger level 506(d) may set a non-default trigger level ranging, in the exemplary embodiment, from 0 to 32. Analogously, enable default wavetable trigger flag 506(a) and wavetable trigger level 506(c) operate in a similar manner with regard to control memory 507 and FIFOs 306(16)–306(47).

Referring now to FIG. 18c, a diagrammatic block diagram of a control register of FIG. 18a is shown. Control register 505(0) includes a sent DMA flag 505(a), a priority value 505(b), a channel valid flag 505(c), an empty flag 505(d), a data bus pointer 505(e), a DMA pointer 505(f), an underrun flag 505(g), a wait for DMA flag 505(h), a stereo flag 505(i) and a run time modify flag 505(j). Sent DMA flag 505(a) may be set by FIFO controller 320 when a DMA request for the particular DMA channel has been sent. Once a DMA request has been fulfilled, FIFO controller 320 resets sent DMA flag 505(a).

Priority value 505(b) indicates the priority of the particular DMA channel. Multiple levels of priority may be established, as discussed. The CPU sets priority value 505(b) when the corresponding FIFO is initialized along with the DMA channel. Typically, the priority level doesn't change until the termination of the DMA channel. DMA engine 372 ascertains the value of priority value 505(b) to place the DMA channel in the appropriate priority level.

Channel valid flag 505(c) indicates whether the particular control register 505(0), and its associated one of FIFOs 306(0), are active. Once CPU 210 initiates a DMA channel FIFO controller 320 sets the channel valid flag 505(c) of a corresponding control register of control memory 505 or 507. The valid flag is reset by the DMA engine upon retrieval of the last word of data.

Empty flag 505(d) indicates that the corresponding FIFO 306 is empty of data. For purposes of illustration, assuming FIFO 306(0) is the corresponding FIFO, when empty flag 505(d) is set, DMA engine 372 instructs FIFO 306(0) to continue outputting the last word or sample of data rather than outputting silence. If the DMA channel is carrying stereo data, then FIFO 306(0) alternately repeats the last two samples for the last left and right channel values. In that respect, both stereo channels are outputting information rather than having one channel silent. If sub-buffer table 380(0) is in an invalid state (channel valid flag 505(c) is reset), i.e., no DMA channel has been established for control register 505(0), empty flag 505(d) is set, and FIFO 306(0) does; not output any data.

Data bus pointer 505(e) indicates that next address for the communicating element to read from or write to in the particular FIFO 306(0). If data is being received by audio processing peripheral 230, then data bus pointer 505(e) is a read pointer for one of the components 341–352 to read the next data word. If data is being written to main memory 212 by audio processing peripheral 230, data bus pointer 505(e) is a write pointer for one of the components 341–352 to write the next word of data.

DMA pointer 505(f) serves a complimentary function as data bus pointer 505(e) except on the other end of FIFO 306(0). When audio processing peripheral 230 is receiving information, DMA pointer 505(f) is a write pointer for DMA controller 310 to place the next word retrieved from main memory 212. When audio processing peripheral 230 is sending information to main memory 212, DMA pointer 505(f) is a read pointer for DMA controller 310 to take the next word of data from FIFO 306(0) to be written to main memory 212.

Had underrun flag 505(g) indicates that FIFO 306(0) has emptied out. Typically, FIFO 306(0) will be repeating the last one or two samples in an empty condition, as discussed. When had underrun flag 505(g) is triggered, FIFO controller 320 may be configured to automatically trigger an interrupt to CPU 210 in order to resolve the condition.

Wait for DMA flag 505(h) indicates whether an interrupt should be sent when had underrun flag 505(g) is set. In one instance, wait for DMA flag 505(h) may be set when FIFO 306(0) is first initialized. At that time, FIFO 306(0) may not have received the first pieces of data, so an interrupt is not desirable. After the DMA channel has been established and running, DMA engine 372 resets wait for DMA flag 505(h).

Stereo flag 505(i) indicates that the DMA channel is a stereo channel. The stereo flag would also prompt the alternating repeat of samples in the underrun/empty conditions discussed above.

Control register 505(0) may also contain a run time modify flag 505(j). Run time modify flag 505(j) indicates whether to freeze data bus pointer 505(e), DMA pointer 505(f) and sent DMA flag 505(a). Typically, run time modify flag 505(j) is set when direct access to DMA controller 310 or FIFOs 306 is required by CPU 210. CPU 210 may access the appropriate elements without disturbing the operations of audio processing device 300 when run time modify flag 505(j) is set.

Control register flags and values 505(a)–505(j) are appropriately initialized during the start up of a DMA channel. Analogously, each control register 505(0)–505(15) operate in a similar fashion, as do the control registers for control memory 507 (i.e., 505(16)–505(47), not shown).

In another embodiment, the FIFOs 306 related to wavetable DMA channels (e.g. FIFOs 306(16)–306(47)) may operate slightly differently from non-wavetable DMA channels. Wavetable 342 receives sampled data from FlIFOs 306(16)–(47) and perform various operations on the data. E.g., wavetable 342 may perform sample rate conversion on the data through interpolation. Interpolation may require more than one sample of data for a single interpolation operation. Additionally, wavetable 342 may control the popping of data from the FIFO (or the advance of the FIFO read pointer).

Wavetable 342 provides a read_fifo, an increment_wavetable_pointer and a increment_count signals to FIFO controller 320 to control the flow of data through the wavetable FIFOs. Wavetable 342 generates a corresponding set of signals for each wavetable FIFO. Wavetable 342 triggers a read_fifo signal to FIFO controller 320 when the wavetable 342 requires data. Instead of just providing a single word or sample the wavetable FIFOs make available to the wavetable 342 any number of samples that the wavetable 342 may require in order to perform an interpolation operation.

In one embodiment wavetable 342 receives the first four samples of data from a single wavetable FIFO (e.g. 306(44)) when wavetable 342 requests data from FIFO controller 320. The first four samples corresponds to the four oldest samples stored in the FIFO. In another embodiment, wavetable receives the first four samples of data from two wavetable FIFOs (e.g. 306(44) and 306(45)) that are a stereo pair. The wavetable FIFOs may provide any number of samples or words in a single read operation triggered by a read fifo signal from wavetable 342.

Wavetable 342 may require that the same set of data previously read from FIFO (e.g. 306(44)) be read several more times before discarding the data. Therefore, wavetable 342 controls the increment of a wavetable pointer in an associated control register of wavetable control memory 507 of FIFO controller 320. Wavetable pointer is the wavetable version of data bus pointer 505(e), as described in reference to FIG. 18.

Wavetable 342 controls the increment of the wavetable pointers in the control registers of wavetable control memory 507 rather than the FIFO controller 320 automatically incrementing the wavetable pointers. Wavetable 342 triggers the increment_wavetable_pointer signal when the wavetable 342 requires the next pieces of data rather than the old pieces of data. FIFO controller 320 appropriately increments wavetable pointer for the specific FIFO after receiving the increment_wavetable_pointer signal.

Increment_count signal determines the amount of increment. Wavetable 342 may need to increment the wavetable pointer by one sample or by a greater number of samples. The type of interpolation and sample rate conversion determines the amount of increment. If FIFO 306(44) typically provides four samples per read and increment_count is one, three of the four of the new set of samples provided in the next read are carried over from the last set of samples. That is, only the oldest sample is "popped" from the FIFO.

The wavetable pointer is incremented to point to the beginning of the new set of four samples in the FIFO 306(44). Depending on the sample rate conversion performed by wavetable 342 increment_count may be any number from zero to a maximum increment count. As described, FIFO controller 320 compares the wavetable pointer and the DMA pointer to determine if the FIFO has reached the trigger level. FIFO controller 320 makes a request for a DMA transfer when a FIFO triggers.

Thus, FIFO controller 342 and FIFOs 306 provides wavetable 342 with the ability to perform different types of interpolation and sample rate conversion related to wavetable data. Those skilled in the art will appreciate the different types of sample rate conversion and interpolation associated with working with sampled data.

Figures 21, 22:
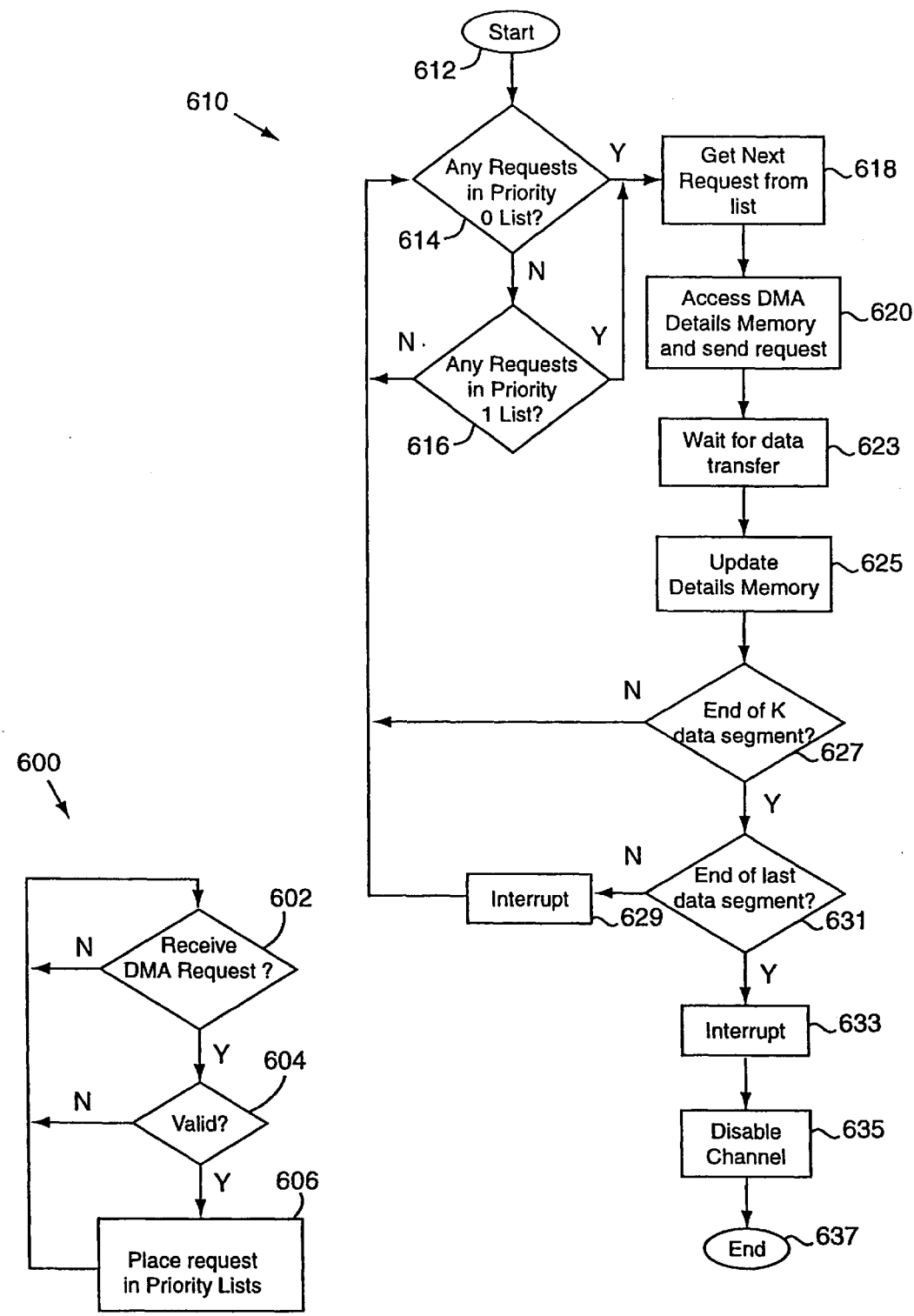
FIG. 21 is a diagrammatic flow chart of the operations of the DMA controller of FIG. 14, in accordance with one embodiment of the present invention.
FIG. 22 is a diagrammatic flow chart of the operations of the DMA controller of FIG. 14, operating in parallel with the flow chart of FIG. 20, in accordance with one embodiment of the present invention.

Having described the various features of one embodiment of the present invention, a description of an operation of the exemplary embodiment follows. FIGS. 19–22 are flowcharts of the operations of CPU 210 (FIG. 19), FIFO controller 320 (FIG. 20) and DMA controller 310 (FIGS. 21–22).

FIG. 19 is a diagrammatic flow chart 550 of the operations of CPU 210, in accordance with one embodiment of the present invention. Prior to the start of flow in block 552, a driver is implemented on CPU 210. The operations of CPU 210 are primarily driven by the driver. In the exemplary embodiment, an audio driver compatible with audio processing peripheral 230 may be implemented on CPU 210. However, the present invention encompasses any type of peripheral/driver pair, as discussed earlier. The implementation of the audio driver also includes the initialization of audio processing peripheral 230, as discussed earlier.

After the implementation of the audio driver, a request is typically made to CPU 210 for a particular piece of data. In the exemplary embodiment, a piece of audio data may be requested. Typically, the request is made by another application implemented on CPU 210, but any type of request involving a DMA transfer may be handled by the present invention. As a request is received by CPU 210, the audio driver directs CPU 210 in the operations outlined in flow chart 550. The operations of flow chart 550 may best be understood in correlation to the previous several figures regarding the present invention.

Flow chart 550 begins in block 552 after a request has been made. Typically, CPU 210 moves the requested piece of data, in this case audio data 150, from a data source to main memory 212 in block 554. After moving audio data 150 from a data source data 150 may be segmented into data segments 150(0)–150(n). At that time, CPU 210 creates a data segments table 152 containing the addresses and sizes of data segments 150(0)–150(n).

Proceeding to block 555, CPU 210 initializes a sub-buffer table (e.g., 380(0)) in DMA memory 378. The particular sub-buffer table initialized by CPU 210 depends on the type of DMA channel being established. By way of example, a non-wavetable DMA channel is established, or DMA channel 0.

In block 555 CPU 210 writes the addresses and sizes of the first four data segments 150(0)–150(3) into the size value registers 384(a) and address value registers 384(b) of data segment pointers 384(0)–384(3), not necessarily in any particular order. The next segment pointers 384(c)(2) of data segment pointers 384(0)–384(3) are also initialized to keep the data segment pointers in the proper order. Sub-buffer enable interrupt flag 384(c)(0) may be set for the first data segment pointer 384(0) (assuming data segment pointer 384(0) points to the first data segment 150(0)) in order to avoid an immediate interrupt before FIFO 306(0) has had adequate time to be filled up with the first pieces of information. However, sub-buffer enable interrupt flags 384(c)(0) may be set for one or more of the remaining data segment pointers 384(1)–384(3). Stop bits 384(c)(1) for data segment pointers 384(0)–384(3) are typically reset, unless one of the first four data segments also happens to be the last data segment 150(n).

Additionally, in block 555, CPU 210 initializes mode register 382 of sub-buffer table 380(0). Check for fault flag 382(a) and had fault flag 382(b) are typically enabled from the start of the DMA channel. To avoid unwanted interrupts, as discussed, wait for DMA flag 505(h) is set until operations have begun.

CPU 210 provides the appropriate value for data format register 382(c) in order for DMA controller 310 to properly control the operations of data formatter 304. The value in data format register 382(c) informs DMA controller 310 what type of data format the requested data 150 is in, and allows for the appropriate data conversion during receipt of the information. Read/write flag 382(d), in the exemplary embodiment, is set to indicate that the audio processing peripheral 230 will be receiving data from main memory 212, rather than writing data to main memory 212.

Interrupt enable flag 382(e) may or may not be set by CPU 210. Since CPU 210 has set the sub-buffer interrupt enable flag 384(c)(0) for the first data segment pointer 384(0), CPU 210 need not also disable the interrupts for the entire channel versus the single data segment pointer. However, the present invention includes the advantage of allowing the user to control interrupt enabling on a single data segment pointer 384(0) basis, or on an entire DMA channel basis. If CPU 210 resets interrupt enable flag 382(e), DMA engine 372 may later set the flag to allow for interrupts to be generated for the channel.

CPU 210, in block 555, will typically initialize current position register 382(f) with the initial offset address of the first data segment pointer 384(0). Generally, the offset address will be all zeros, however any appropriate address may be initially set. During the course of operation, DMA engine 372 will adjust current position register 382(f) to correspond to where the next piece of data from the current data segment is located. ROM flag 382(g), in the exemplary embodiment, is set by CPU 210 since the requested data 150 is being retrieved from main memory 212 instead of ROM 360.

After DMA controller 310 has been initialized, CPU 210 initializes FIFO controller 320 in block 557. DMA flag 505(a) is typically reset since no DMA request has been sent. The priority of the DMA channel is set in priority value register 505(b). Empty flag 505(d) may be reset or set since the corresponding FIFO 306(0) is technically empty, but the empty flag will be ignored due to the disabling of either interrupt enable flag 384(c)(0) or 382(f). Data bus pointer 505(e) and DMA pointer 505(f) are set to the same value, the first entry in FIFO 306(0), since there is currently no data. Wait for DMA flag 505(h) is set to avoid erroneous interrupts at start up Wait for DMA flag 505(h) may be reset once operations have begun. Stereo flag 505(i) may be set or reset appropriately, depending on the type of DMA channel. Run time modify flag 505(f) is typically reset in the initialization phase. During later operations, CPU 210 may set run time modify flag 505(j) when CPU 210 is performing such an operation.

Additionally, in block 557, CPU 210 initializes trigger register 506 for a particular control memory 505. In the exemplary embodiment, enable default data bus trigger flag 506(b) is reset, and data bus trigger level 506(d) is set to 16. This operation indicates to FIFO controller 320 that when FIFO 306(0) is half empty a DMA request should be sent.

Another step in the initialization process is the setting of channel valid flag 505(c). The channel valid flag indicates that the particular DMA channel has been activated and the appropriate sub-buffer table 380(0), FIFO control register 505(0) and FIFO 306(0) are active.

After FIFO controller 320 has been initialized, CPU 210 proceeds to initialize one of the operational components 341–352 in block 560. One of the components 341–352 is initialized to be prepared to receive data from FIFO 306(0) and perform the appropriate operations on the data. Additionally, data bus 330 is configured to allow for data to be passed from FIFO 306(0) to the selected component 341–352. If the DMA channel is a wavetable DMA channel, data may be directly routed from one of FIFOs 306 to wavetable 342, or via data bus 330. For purposes of illustration, CPU 210 may select mixer 344 to receive data from FIFO 306(0).

After data bus 330 and mixer 344 have been initialized, CPU 210 waits for an interrupt from DMA controller 310 in block 562. As discussed earlier, CPU 210 may also be in a timed wait state rather than a wait state triggered by an interrupt. The timed. wait state may be arranged such that CPU 210 periodically updates sub-buffer table 380(0) instead of waiting for an interrupt. Additionally, a combination of a timed wait state and an interrupt triggered wait state may be employed.

In a preferred embodiment, CPU 210 is in a timed wait state while still capable of receiving interrupts. After the expiration of a predetermined time interval CPU 210 polls the progress of the peripheral. The sub-buffer table is updated to ensure that the peripheral device may keep processing data without having to generate an interrupt. While the present inventions generates fewer interrupts than prior art systems, the periodic polling by the CPU further decreases the number of interrupts that the CPU responds to. The flow of operations of the CPU is interrupted less frequently and can operate more efficiently. Also, the number of times the CPU must poll the peripheral device is decreased because of the audio processing device's use of sub-buffers. The sub-buffers allows the audio processing device to operate autonomously for a greater period of time before requiring updates. In the cases where the audio processing device runs out of data before the timed update it may interrupt the CPU for an immediate update.

Once CPU 210 is woken from the wait state of block 562, either from an interrupt or a timed trigger, CPU 210 proceeds to block 564. In block 564 CPU 210 determines if the interrupt received, if any, was due to DMA controller 310 having reached the end of requested data 150, as discussed further below. If not, CPU 210 proceeds to block 566 and updates sub-buffer table 384(0) with the addresses and sizes of the next data segments 150(4), 150(5), 150(6) and/or 150(7). After sub-buffer table 384(0) has been updated, CPU returns to block 562. If in block 564 the interrupt was due to the DMA reaching the end of data 150, CPU 210 proceeds to block 568. In block 568 CPU 210 resets mixer 344 and data bus 330. The operations of CPU 210, with regard to the particular channel, then ends in block 570.

FIG. 20 is a diagrammatic flow chart 580 of the operations of FIFO controller 320. Once CPU 210 has initialized FIFO controller 320 in block 557 of FIG. 19, FIFO controller 320 may begin operation in block 582. FIFO controller 320 monitors the access to FIFO 306(0) on either the read or the write side of the FIFO in block 584. If an access occurs, FIFO controller 320 proceeds to block 586. In block 586, FIFO controller 320 determines if the access was a write from main memory 212 via data formatter 304 or a read from mixer 344.

If the access to FIFO 306(0) is a write from data formatter 304, in block 588, FIFO controller 320 updates DMA pointer 505(f) to indicate the new insertion point for data entered later into FIFO 306(0). FIFO controller 320 then returns to block 584 and waits for another access.

If the access to FIFO 306(0) is a read from mixer 344, FIFO controller 320 proceeds to block 590. In block 590 FIFO controller 320 reads data bus pointer 505(e) to determine where to extract the next word to provide to mixer 344. Additionally, FIFO controller 320 compares data bus pointer 505(e) with DMA pointer 505(f), enable default data bus trigger flag 506(b) and data bus trigger level 506(d) to determine if a DMA request is necessary. The comparison also determines if an underrun has occurred, as is checked by block 591. If an underrun has occurred a request for an interrupt is sent to DMA controller 310 in block 592, which is passed on to CPU 210.

If no underrun condition exists FIFO controller 320 proceeds to block 593 to check if a trigger is required. If a trigger is required, FIFO controller 320 sends a DMA request to DMA controller 310 in block 595. After an interrupt request or a DMA request has been sent in either blocks 592 or 595, respectively, FIFO controller 320 outputs the appropriate data to mixer 344 in block 596. In one embodiment, the data may be output from FIFO 306(0) simultaneously with the processes of blocks 590–593 and 595. After data has been read from FIFO 306(0) by mixer 344 FIFO controller 320 updates data bus pointer 505(e) to the next word in the FIFO. FIFO controller 320 then returns to block 584.

FIG. 21 is a diagrammatic flow chart 600 of the operations of DMA controller 310 after a DMA request has been sent from FIFO controller 320 in block 595 of FIG. 20. DMA controller 310 typically waits in block 602 until a DMA request has been received from FIFO controller 320. Once a request is received, DMA controller 310 proceeds to block 604 to determine if the DMA request is coming from a valid DMA channel. DMA controller 310 checks valid flag 505(c) of control register 505(0). If the DMA channel is valid, DMA controller 310 proceeds to block 606, else DMA controller returns to block 602. In block 606 DMA controller 310 places the request in the appropriate queue list 401 or 402, in the exemplary embodiment 401. The request is placed in the appropriate linked list of the queue list 401 based upon priority flag 505(c), as set by CPU 210 in block 557 of FIG. 19. In another embodiment DMA controller 310 assumes that requests are only received from valid channels, and the operations of block 604 may be omitted.

FIG. 22 is a diagrammatic flow chart 610 of the operations of DMA controller 310, operating in parallel with flow chart 580 of FIG. 20. After DMA controller 310 has been initialized in block 555 of FIG. 19, the operations of DMA controller 310 begin in block 612. Proceeding to block 614, DMA engine 372 continually checks request queue 374 to see if there are any high priority DMA requests, either of the wavetable variety or the data bus variety. If there are no high priority DMA requests of either type, DMA engine 372 proceeds to block 616 to determine if any lower level request are present. Further levels of checking may proceed, if necessary, if no lower priority DMA requests are present in request queue 374. DMA engine 372 keeps checking request queue 374 until a DMA request is encountered. Should more than one DMA request be encountered with equal priority the first in time request is handled, as discussed earlier. If two DMA requests of equal priority of different types are encountered, DMA controller 372 will toggle from one type to the other.

The next DMA request is provided by request queue 374 from the appropriate linked list from queue list 401 or 402 to DMA engine 372 in block 618. DMA engine 372 then proceeds to block 620 to check DMA details memory 378 in order to prepare a DMA request. DMA 372 reads current position register 382(f) and current sub-buffer register 382 (g) to determine where to obtain the next pieces of data. DMA engine 372 also obtains the number of words or samples needed to fill up FIFO 306(0) from FIFO controller 320. FIFO controller 320 determines the number of words needed by comparing the data bus pointer 505(e) and DMA pointer 505(f). Once the appropriate information is gathered, DMA engine 372 sends a DMA request to PCI interface FSM 370 to be passed along to PCI bus interface 302 and to PCI bus controller 216.

DMA engine 372 then waits until the DMA request is answered by PCI bus controller 216 in block 623. Once the request is answered, DMA engine 372 sends the appropriate control signals to PCI bus interface 302, data formatter 304, and FIFO controller 320 in order to retrieve data from main memory 212, and transfer the data to FIFO 306(0).

After DMA engine 372 has successfully transferred data from main memory 212 to FIFO 306(0), DMA engine 372 updates DMA details memory 378 with the new current position, and if necessary the new current sub-buffer, in block 625. DMA engine 372 then proceeds to block 627 to determine if the enable interrupt flag 384(c)(0) is set for the current data segment pointer 384(0), and the end of the current data segment pointed to by data segment pointer 384(0) has been reached. If so, then an interrupt is required so the sub-buffer table 380(0) can be updated. However, DMA engine 372 must determine if the current data segment was the last data segment 150(n) in block 631. Otherwise operations proceed back to block 614.

If the current data segment was not the last data segment 150(n) then DMA engine 372 proceeds to block 629. In block 629 an interrupt is sent to CPU 210 to prompt an update, as discussed in reference to blocks 562, 564 and 566 of FIG. 19. If the end of the last data segment has been reached then DMA engine proceeds to block 633 where an interrupt is sent to CPU 210, as discussed in reference to blocks 562, 564, 568 and 570 of FIG. 19. If an end of data interrupt has been sent, DMA engine 372 disables the DMA channel in block 635 by resetting the channel valid flag 505(c) of the FIFO controller 320. The operations of DMA engine 372 and DMA controller 310 end for that particular DMA channel in block 637.

The operations of DMA controller 310, as outlined in flow chart 610 of FIG. 22, are typically conducted for each DMA channel that is established between audio processing peripheral 230 and main memory 212. As all the resources, such as the various sub-buffer tables 380, FIFOs 306 and control memory 505 and 507 are made available with the termination of a DMA channel, they may be reassigned to newly established DMA channels. Thus, the preceding should be interpreted as a description of an exemplary DMA channel.

Further, while the preceding may have focused on one or more exemplary types of DMA channels, more specific types of DMA channels fall within the scope of the present invention. The other types of DMA channels, by way of example, wavetable DMA channel or a DMA channel established for audio processing peripheral 230 to provide data to main memory 212, may be performed with little variation from the preceding description, in accordance with the present invention.

However, all types of DMA channels established and maintained, in accordance with the present invention, are more efficient and versatile than prior art DMA channels. By utilizing a sub-buffer table maintained within the peripheral, which need only be periodically updated by the CPU, the burden on the CPU is greatly alleviated. At the same time, the peripheral is not required to request multiple DMA accesses to first obtain the addresses of data segments, and again to obtain the data from the data segments.

At the same time, multiple DMA channels may be established and efficiently maintained, in accordance with the present invention. By setting up multiple DMA channels, real-time operations may be performed on more than one piece of data at any given time. In order to achieve the same result in prior art methods and apparatuses, the peripheral would typically be required to possess a large amount of memory, or the bus would need to have a larger bandwidth. At the same time, prior art methods and apparatuses would need to avoid overburdening the CPU with all the housekeeping tasks.

Utilizing the techniques for efficiently maintaining a DMA channels, in accordance with the present invention, multiple DMA channels may be established without unduly burdening the CPU. Also, in one embodiment of the present invention, the DMA channels may be prioritized such that real time operations may be performed on multiple DMA channels with differing data rates. The prior art, not being capable of multiple DMA channels, typically fails to include any method of prioritization.

Multiple direct memory access channels also allow data processing to take place in a peripheral device rather than having the CPU perform data processing tasks. The ability to transfer greater amounts of data with less of a burden on the CPU raw unprocessed data may be performed on a peripheral device. Thus, one of the primary goals of peripheral devices—reducing the burden on the CPU—is achieved by the present inventions.

The present inventions also overcome many other barriers that made multiple DMA channels prohibitive in prior art systems. Arbitration latency, system interrupt latency and burdensome CPU management of the DMA transfers have prevented prior art systems from implementing multiple DMA channels. However, the present inventions overcome theses obstacles. Arbitration latency is decreased by having the peripheral control the transactions of the multiple DMA channels.

System interrupt latencies and CPU burden are decreased by requiring the CPU to only periodically check on the progress of the multiple DMA channels. This is possible by the use of sub-buffers that allow the peripheral to perform many DMA transactions before needing updates by the CPU.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. It is therefore intended that the following appended claims be interpreted as including all such alterations, permutations, and equivalents as fall within the spirit and scope of the present invention.

What is claimed is:

1. A method of accessing a memory in a computer system, the computer system including a system bus controller in communication with the memory, the method comprising:

providing a peripheral device coupled to the computer system, whereby the peripheral device is in communication with the system bus controller;

establishing a plurality of direct memory access connections between the memory and the peripheral device by way of the system bus controller, each of the plurality of direct memory access connections having a priority and including one or more direct memory access requests, wherein the peripheral device retrieves a block of data located in the memory through a selected direct memory access connection;

performing real-time operations on the block of data;

buffering the block of data in a selected one of a plurality of buffer memories, each of the plurality of buffer memories having a capacity, wherein the plurality of buffer memories is associated with the plurality of direct memory access connections;

monitoring a level of the capacity of the selected buffer memory that is occupied;

determining if the level of the capacity of the selected buffer memory has reached a predetermined level;

queuing a first direct memory access request associated with the selected direct memory access connection;

queuing a second direct memory access request associated with a second direct memory access connection of the plurality of direct memory access connections; and prioritizing the first and second direct memory access requests based upon the priorities of the first and second direct access connections and designating a highest priority direct memory access request.

2. A method as recited in claim 1 further comprising:

initiating the highest priority direct memory access request; and repeating the operation of prioritizing with one or more uninitiated direct memory access requests and initiating the highest priority direct memory access request.

3. A method of accessing a memory in a computer system, the computer system including a system bus controller in communication with the memory, the method comprising:

providing a peripheral device coupled to the computer system, whereby the peripheral device is in communication with the system bus controller;

establishing a plurality of direct memory access connections between the memory and the peripheral device by way of the system bus controller, each of the plurality of direct memory access connections having a priority and including one or more direct memory access requests, wherein the peripheral device retrieves a block of data located in the memory through a selected direct memory access connection;

performing real-time operations on the block of data;

buffering the block of data in a selected one of a plurality of buffer memories, each of the plurality of buffer memories having a capacity, wherein the plurality of buffer memories is associated with the plurality of direct memory access connections;

performing real-time operations on the buffered block of data, wherein a selected operational component performs the real-time operations on the buffered block of data received from the selected buffer memory; and repeating a last piece of data of the buffered block of data, wherein the selected. buffer memory repeats the last piece of data when the selected buffer memory is empty.

4. A method of accessing a memory in a computer system, the computer system including a system bus controller in communication with the memory, the method comprising:

providing a peripheral device coupled to the computer system, whereby the peripheral device is in communication with the system bus controller;

establishing a plurality of direct memory access connections between the memory and the peripheral device by way of the system bus controller, each of the plurality of direct memory access connections having a priority and including one or more direct memory access requests, wherein the peripheral device retrieves a block of stereo data located in the memory through a selected direct memory access connection;

performing real-time operations on the block of stereo data;

buffering the block of stereo data in a selected one of a plurality of buffer memories, each of the plurality of buffer memories having a capacity, wherein the plurality of buffer memories is associated with the plurality of direct memory access connections;

performing real-time operations on the buffered block of stereo data, wherein a selected operational component performs the real-time operations on the buffered block of stereo data received from the selected buffer memory; and repeating a last piece of data and a next to last piece of data of the buffered block of stereo data, wherein the selected buffer memory repeats the last piece of data when the selected buffer memory is empty such that the last piece of audio data is associated with a first audio channel and the next to last piece of audio data is associated with a second audio channel.

5. A peripheral device coupled to a computer system having a memory and a system bus controller in communication with the memory and the peripheral device, the peripheral device comprising:

an interface configured to establish a plurality of direct memory access connections between the memory and the peripheral device by way of the system bus controller, each of the plurality of direct memory access connections having a priority and including one or more direct memory access requests, wherein the peripheral device is configured to retrieve a block of data located in the memory through a selected direct memory access connection;

a processor configured to perform real-time operations on the block of data;

a plurality of buffer memories configured to buffer the block of data, each of the plurality of buffer memories having a capacity, wherein the plurality of buffer memories is associated with the plurality of direct memory access connections;

a controller configured to:
monitor a level of the capacity of the selected buffer memory that is occupied;
determine if the level of the capacity of the selected buffer memory has reached a predetermined level;
queue a first direct memory access request associated with the selected direct memory access connection;
queue a second direct memory access request associated with the second direct memory access connection; and
prioritize the first and second direct memory access requests based upon the priorities of the first and second direct access connections and designating a highest priority direct memory access request.

6. A peripheral device as recited in claim 5, wherein said controller comprises:

a first controller configured to:
monitor a level of the capacity of the selected buffer memory that is occupied;
determine if the level of the capacity of the selected buffer memory has reached a predetermined level;
trigger a first direct memory access request associated with the selected direct memory access connection; and
trigger a second direct memory access request associated with a second direct memory access connection of the plurality of direct memory access connections; and a second controller configured to:
queue the first direct memory access request;
queue the second direct memory access request; and
prioritize the first and second direct memory access requests based upon the priorities of the first and second direct access connections and designating a highest priority direct memory access request.

7. A peripheral device as recited in claim 5, wherein said controller is further configured to:
- initiate the highest priority direct memory access request; and
- repeat the operation of prioritizing with one or more uninitiated direct memory access requests and initiating the highest priority direct memory access request.

8. A peripheral device coupled to a computer system having a memory and a system bus controller in communication with the memory and the peripheral device, the peripheral device comprising:
- an interface configured to establish a plurality of direct memory access connections between the memory and the peripheral device by way of the system bus controller, each of the plurality of direct memory access connections having a priority and including one or more direct memory access requests, wherein the peripheral device is configured to retrieve a block of data located in the memory through a selected direct memory access connection;
- a plurality of buffer memories configured to buffer the block of data, each of the plurality of buffer memories having a capacity, wherein the plurality of buffer memories is associated with the plurality of direct memory access connections, and wherein each of the buffer memories is configured to repeat a last piece of data of the buffered block of data when the buffer memory is selected at a time when the buffer memory is empty; and
- a processor associated with a selected operational component configured to receive the buffered block of data from a selected buffer memory and to perform real-time operations on the buffered block of data.

9. A peripheral device as recited in claim 8, wherein the block of data is a block of stereo data, the block of stereo data being comprised of pieces of audio data, and wherein each of the buffer memories is configured to alternately repeat a last piece of data and a next to last piece of audio data of the buffered block of stereo data when the buffer memory is selected at a time when the buffer memory is empty such that the last piece of audio data is associated with a first audio channel and the next to last piece of audio data is associated with a second audio channel.

* * * * *